(12) United States Patent
Minami et al.

(10) Patent No.: US 9,197,824 B2
(45) Date of Patent: Nov. 24, 2015

(54) IMAGE PICKUP UNIT, METHOD OF DRIVING IMAGE PICKUP UNIT, AND IMAGE PICKUP DISPLAY SYSTEM

(71) Applicant: Sony Corporation, Tokyo (JP)

(72) Inventors: Yuichiro Minami, Kanagawa (JP);
Michiru Senda, Kanagawa (JP);
Tsutomu Harada, Kanagawa (JP);
Masayuki Katakura, Kanagawa (JP)

(73) Assignee: Sony Corporation, Tokyo (JP)

( * ) Notice: Subject to any disclaimer, the term of this patent is extended or adjusted under 35 U.S.C. 154(b) by 114 days.

(21) Appl. No.: 13/942,774

(22) Filed: Jul. 16, 2013

(65) Prior Publication Data

US 2014/0022426 A1 Jan. 23, 2014

(30) Foreign Application Priority Data

Jul. 23, 2012 (JP) ................. 2012-162455

(51) Int. Cl.
| | |
|---|---|
| G06F 3/042 | (2006.01) |
| H04N 5/32 | (2006.01) |
| H04N 5/376 | (2011.01) |
| H04N 5/335 | (2011.01) |
| G06F 3/041 | (2006.01) |

(52) U.S. Cl.
CPC .............. *H04N 5/3355* (2013.01); *G06F 3/042* (2013.01); *G06F 3/0412* (2013.01); *G06F 3/0421* (2013.01); *H04N 5/32* (2013.01); *H04N 5/376* (2013.01)

(58) Field of Classification Search
CPC ....... H04N 5/3355; H04N 5/376; H04N 5/32; G06F 3/0412; G06F 3/0421; G06F 3/042
USPC .................................. 348/294, 308
See application file for complete search history.

(56) References Cited

U.S. PATENT DOCUMENTS

2006/0097132 A1* 5/2006 Nam et al. ............... 250/208.1
2012/0261557 A1* 10/2012 Sugita et al. ............. 250/208.2

FOREIGN PATENT DOCUMENTS

JP Hei 11-296129 A 10/1999
JP 2011-135561 A 7/2011

\* cited by examiner

*Primary Examiner* — Mekonnen Dagnew
(74) *Attorney, Agent, or Firm* — Sony Corporation

(57) ABSTRACT

An image pickup unit includes: a signal generating section generating a pulse signal that makes transitions between a first voltage and a low-noise second voltage; a voltage holding section holding a difference between a voltage of the pulse signal and a voltage of an output node; a voltage setting section that generates a pixel selection signal through setting the voltage of the output node to a third voltage in correspondence to a transition of the pulse signal from the second voltage to the first voltage, and outputs the pixel selection signal from the output node; and an image pickup section driven by the pixel selection signal.

14 Claims, 30 Drawing Sheets

IMAGE PICKUP UNIT, METHOD OF DRIVING IMAGE PICKUP UNIT, AND IMAGE PICKUP DISPLAY SYSTEM

BACKGROUND

The present disclosure relates to an image pickup unit performing photoelectric conversion, a method of driving the image pickup unit, and an image pickup display system including the image pickup unit.

There have been traditionally proposed various types of image pickup units including pixels (image pickup pixels) that each incorporate a photoelectric conversion element. For example, Japanese Unexamined Patent Application Publication No. 2011-135561 discloses a so-called optical touch panel and a radiographic image pickup unit as an example of such an image pickup unit including the photoelectric conversion element. In general, such an image pickup unit captures an image through scanning pixels, for example, at every line as with a display unit such as a liquid crystal display unit. For example, Japanese Unexamined Patent Application Publication No. 11-296129 discloses a pixel drive circuit for a display unit, which generates a gate pulse for driving each pixel line.

SUMMARY

The image pickup unit is in general desired to capture a high-quality image. Specifically, for example, the image pickup unit is desired to capture an image having a high signal-to-noise ratio (S/N ratio).

It is desirable to provide an image pickup unit, a method of driving the image pickup unit, and an image pickup display system capable of improving quality of a captured image.

According to an embodiment of the present disclosure, there is provided an image pickup unit including: a signal generating section generating a pulse signal that makes transitions between a first voltage and a low-noise second voltage; a voltage holding section holding a difference between a voltage of the pulse signal and a voltage of an output node; a voltage setting section that generates a pixel selection signal through setting the voltage of the output node to a third voltage in correspondence to a transition of the pulse signal from the second voltage to the first voltage, and outputs the pixel selection signal from the output node; and an image pickup section driven by the pixel selection signal.

According to an embodiment of the present disclosure, there is provided a method of driving an image pickup unit. The method includes: holding a difference between a voltage of an output node and a voltage of a pulse signal that makes transitions between a first voltage and a low-noise second voltage; generating a pixel selection signal through setting the voltage of the output node to a third voltage in correspondence to a transition of the pulse signal from the second voltage to the first voltage, and outputting the pixel selection signal from the output node; and driving an image pickup section by the pixel selection signal.

According to an embodiment of the disclosure, there is provided an image pickup display system provided with an image pickup unit, and a display unit that displays an image captured by the image pickup unit. The image pickup unit includes: a signal generating section generating a pulse signal that makes transitions between a first voltage and a low-noise second voltage; a voltage holding section holding a difference between a voltage of the pulse signal and a voltage of an output node; a voltage setting section that generates a pixel selection signal through setting the voltage of the output node to a third voltage in correspondence to a transition of the pulse signal from the second voltage to the first voltage, and outputs the pixel selection signal from the output node; and an image pickup section driven by the pixel selection signal.

In the image pickup unit, the method of driving the image pickup unit, and the image pickup display system according to the above-described respective embodiments of the disclosure, the image pickup section is driven by the pixel selection signal. The pixel selection signal is generated through holding the difference between the voltage of the pulse signal that makes a transition between the first voltage and the low-noise second voltage and the voltage of the output node, and setting the voltage of the output node to the third voltage in correspondence to the transition of the pulse signal.

According to the image pickup unit, the method of driving the image pickup unit, and the image pickup display system of the above-described respective embodiments of the disclosure, a pixel selection signal is generated through holding a difference between a voltage of a pulse signal that makes a transition between a first voltage and a low-noise second voltage and a voltage of an output node, and setting the voltage of the output node to a third voltage in correspondence to transition of the pulse signal; hence, quality of a captured image is improved.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Hereinafter, some embodiments of the present disclosure are described in detail with reference to the accompanying drawings. It is to be noted that description is made in the following order.

1. First Embodiment
2. Second Embodiment
3. Application Example

1. First Embodiment

Exemplary Configuration

Figure 1:
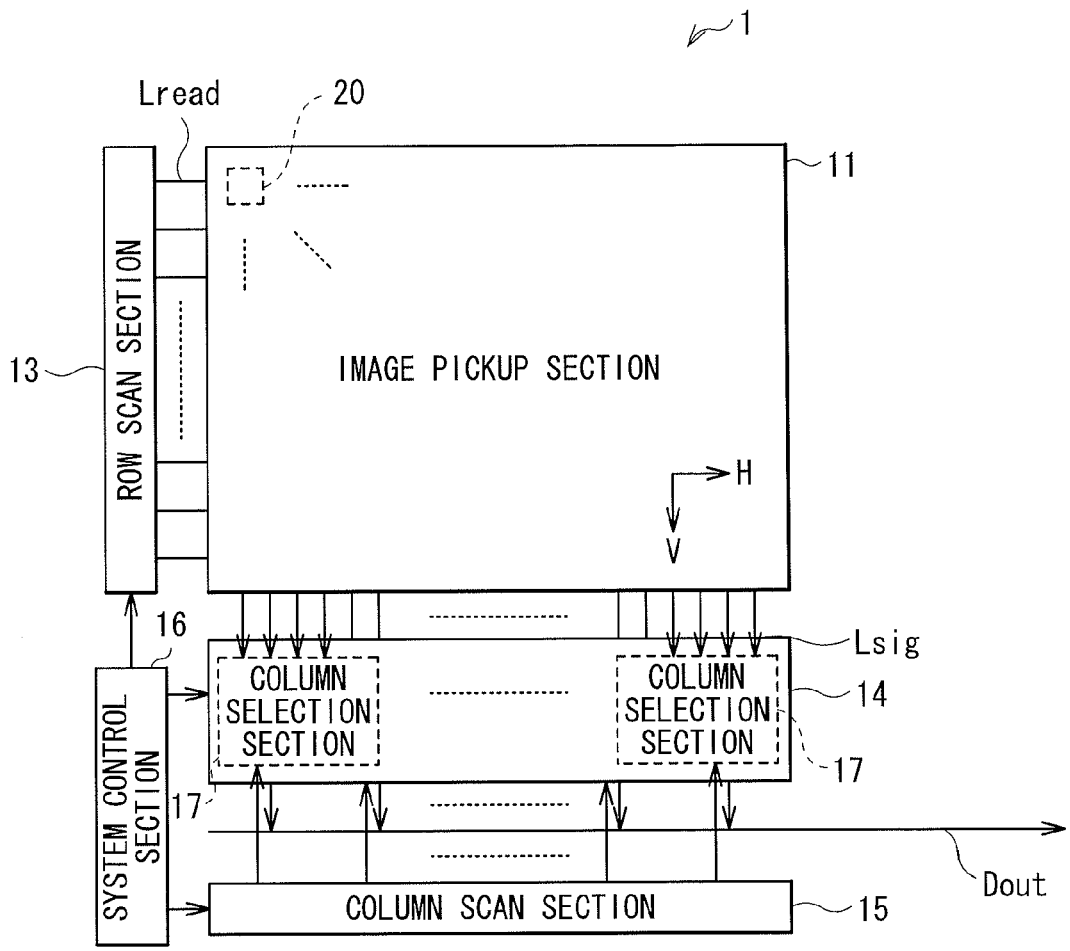
FIG. 1 is a block diagram illustrating an exemplary configuration of an image pickup unit according to a first embodiment of the present disclosure.

FIG. 1 illustrates an exemplary configuration of an image pickup unit according to a first embodiment. The image pickup unit 1 is a unit that reads information of a subject (captures an image of a subject) based on image pickup light. It is to be noted that since a method of driving the image pickup unit and an image pickup display system according to respective embodiments of the disclosure are embodied by the first embodiment, they are described together.

The image pickup unit 1 includes an image pickup section 11, a system control section 16, a row scan section 13, an analog-to-digital (A/D) conversion section 14, and a column scan section 15.

The image pickup section 11 generates an electric signal in response to received image pickup light. The image pickup section 11 has pixels (image pickup pixels) 20 that are two-dimensionally arranged in a matrix, each pixel having a photoelectric conversion section (photoelectric conversion element 21 described later) that generates signal charge having a charge amount corresponding to the quantity of light of the received image pickup light, and stores the signal charge in the photoelectric conversion section. In the following description, as illustrated in FIG. 1, the horizontal direction in the image pickup section 11 is denoted as "H" direction, and the vertical direction therein is denoted as "V" direction.

Figure 2:
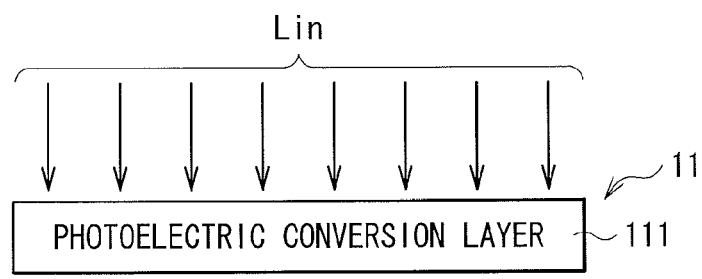
FIG. 2 is an explanatory diagram illustrating an exemplary configuration of an image pickup section illustrated in FIG. 1.

FIG. 2 illustrates an exemplary schematic configuration of the image pickup section 11. The image pickup section 11 has a photoelectric conversion layer 111 having the plurality of pixels 20 arranged therein. As illustrated in the drawing, the photoelectric conversion layer 111 performs photoelectric conversion based on the received image pickup light Lin (conversion from the image pickup light Lin to signal charge).

Figure 3:
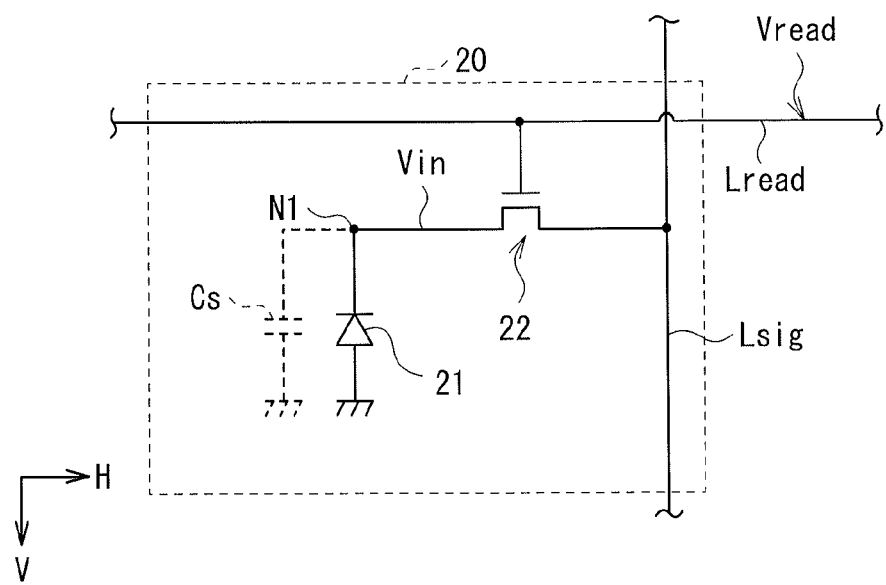
FIG. 3 is a circuit diagram illustrating an exemplary configuration of a pixel illustrated in FIG. 1.

FIG. 3 illustrates an exemplary circuit configuration of the pixel 20. The pixel 20 includes one photoelectric conversion element 21 and one transistor 22. The pixel 20 is connected to a read control line Lread extending along the H direction and a signal line Lsig extending along the V direction.

The photoelectric conversion element 21, which may be configured of, for example, a photodiode of a positive intrinsic negative (PIN) type, generates signal charge having a charge amount corresponding to the quantity of light of the received light (image pickup light) as described above. In this exemplary case, the photoelectric conversion element 21 has an anode that is grounded, and a cathode that is connected to the transistor 22 through an accumulation node N1. The accumulation node N1 is connected to an accumulation node capacitance Cs mainly configured of parasitic capacitance of the photoelectric conversion element 21. The accumulation node capacitance Cs is connected in parallel to the photoelectric conversion element 21.

The transistor 22 is a transistor (read-only transistor) that is turned on in response to a row scan signal Vread supplied through the read control line Lread, and thus outputs the signal charge acquired by the photoelectric conversion element 21 to the signal line Lsig. In this exemplary case, the transistor 22 is configured of a field effect transistor (FET) of an N channel type (N type). However, the transistor 22 may be configured of a field effect transistor (FET) of a P channel type (P type). For example, the transistor 22 may be formed of silicon semiconductor such as microcrystalline silicon (Si), polycrystalline silicon (polysilicon), and amorphous silicon. Alternatively, the transistor 22 may be formed of oxide semiconductor such as indium-gallium-zinc oxide (InGaZnO) and zinc oxide (ZnO). Microcrystalline silicon, polycrystalline silicon, and oxide semiconductor each have a high mobility μ compared with amorphous silicon, and therefore each allow the transistor 22 to perform high-speed reading of signal charge, for example. In the pixel 20, the transistor 22 has a gate that is connected to the read control line Lread, a source that is connected to the signal line Lsig, and a drain that is connected to the cathode (accumulation node N1) of the photoelectric conversion element 21.

The system control section 16 illustrated in FIG. 1 controls operation of each of the row scan section 13, the A/D conversion section 14, and the column scan section 15. Specifically, the system control section 16 has a timing generator that generates various timing signals (control signals), and controls the above circuit sections to operate in synchronization with one another based on the timing signals.

The row scan section 13 drives a plurality of pixels 20 in the image pickup section 11 in rows (in horizontal lines) (performs line sequential scan). Specifically, as described later, the row scan section 13 sequentially selects a row to be subjected to read drive Dread or reset drive Dreset. In such operation, the row scan section 13 performs the line sequential scan through supplying a row scan signal Vread to each pixel 20 through the read control line Lread.

Figure 4:
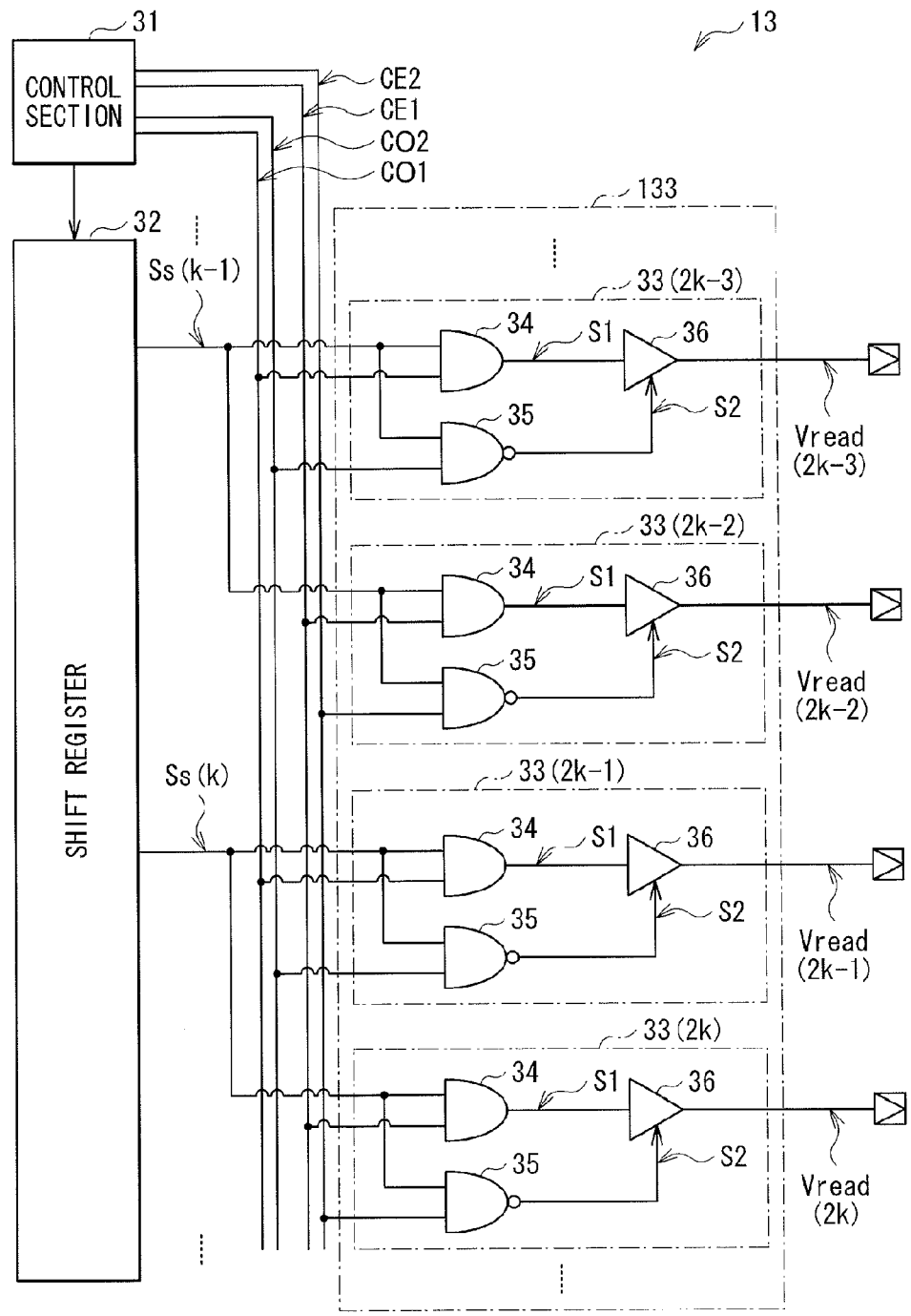
FIG. 4 is a block diagram illustrating an exemplary configuration of a row scan section illustrated in FIG. 1.

FIG. 4 illustrates an exemplary configuration of the row scan section 13. The row scan section 13 includes a control section 31, a shift register 32, and a drive section 133 having a plurality of drive circuits 33. For example, such circuit sections may be formed of crystal silicon or polysilicon.

The control section 31 controls the shift register 32 and the drive section 133 based on the timing signals (not shown) supplied from the system control section 16. For control of the drive section 133, the control section 31 generates control signals CO1, CO2, CE1, and CE2, and controls the drive section 133 using the control signals. In this exemplary case, the control signals CO1 and CO2 are control signals for controlling drive of a pixel line as each odd row in the image pickup section 11, and the control signals CE1 and CE2 are control signals for controlling drive of a pixel line as each even row therein.

The shift register 32 generates a scan signal Ss for selecting a pixel line to be driven in the image pickup section 11 based on the control signals supplied from the control section 31. In this exemplary case, each scan signal Ss corresponds to two pixel lines. Specifically, for example, a kth scan signal Ss(k) may correspond to a $(2k-1)$th (odd-numbered) pixel line and a $(2k)$th (even-numbered) pixel line together.

Although the shift register 32 is used in this exemplary case, the circuit configuration is not limited thereto. Alternatively, for example, the row scan section 13 may be configured using an address decoder that generates the scan signal Ss based on an address signal. For example, the address decoder may be used in the case where the image pickup section 11 has a small number of pixel lines.

The drive section 133 generates the row scan signal Vread based on the scan signal Ss supplied from the shift register 32 and the control signals CO1, CO2, CE1, and CE2. Each of the drive circuits 33 is provided in correspondence to the read control line Lread. Specifically, a $(2k-1)$th drive circuit $33(2k-1)$ generates a row scan signal Vread$(2k-1)$ based on a scan signal Ss(k) and the control signals CO1 and CO2, and supplies the row scan signal Vread$(2k-1)$ to the read control line Lread$(2k-1)$. A $(2k)$th drive circuit $33(2k)$ generates a row scan signal Vread$(2k)$ based on a scan signal Ss(k) and the control signals CE1 and CE2, and supplies the row scan signal Vread$(2k)$ to the read control line Lread$(2k)$.

The drive circuit 33 includes an AND circuit 34, a NAND circuit 35, and a driver 36. Description is now made on the $(2k-1)$th drive circuit $33(2k-1)$ as an example. It is to be noted that similar description is made on the $(2k)$th drive circuit $33(2k)$ except that the control signal CE1 is used in place of the control signal CO1, and the control signal CE2 is used in place of the control signal CO2.

The AND circuit 34 generates a logical product (AND) of the scan signal Ss(k) supplied from the shift register 32 and the control signal CO1 supplied from the control section 31, and outputs the logical product as a signal S1. The NAND circuit 35 generates negative AND of the scan signal Ss(k) and the control signal CO2 supplied from the control section 31, and outputs the negative AND as a signal S2. The driver 36 generates a row scan signal Vread$(2k-1)$ based on the signals S1 and S2.

Figure 5:
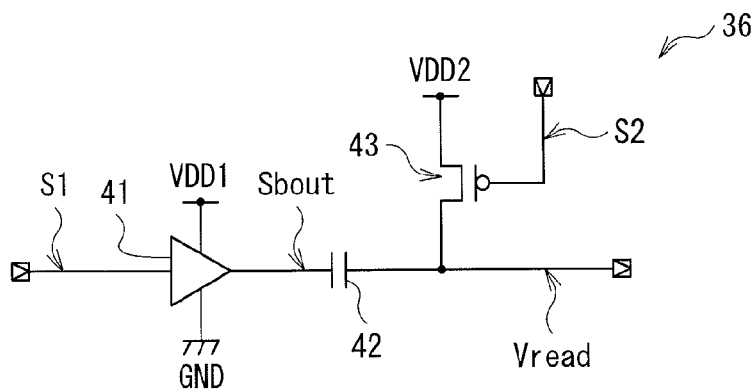
FIG. 5 is a circuit diagram illustrating an exemplary configuration of a driver according to the first embodiment.

FIG. 5 illustrates an exemplary configuration of the driver 36. The driver 36 includes a buffer circuit 41, a capacitor 42, and a transistor 43. The buffer circuit 41, based on the signal S1, generates a signal Sbout with a high-level voltage of voltage VDD1 and a low-level voltage of ground voltage GND. The ground voltage GND is a reference voltage of the system, and is therefore low in noise compared with other voltages (for example, the voltage VDD1). The capacitor 42 has a first terminal that is connected to an output terminal of the buffer circuit 41, and a second terminal that is connected to the transistor 43 and to the output terminal of the driver 36. In this exemplary case, the transistor 43 is configured of a field effect transistor of a P channel type, and has a gate to which the signal S2 is supplied, a source to which a voltage VDD2 is supplied, and a drain that is connected to the second terminal of the capacitor 42 and to the output terminal of the driver 36. The voltage VDD1 may be, for example, 12 V, and the voltage VDD2 may be, for example, 8 V. For example, part or all of the driver 36 may be provided in one chip or on one substrate together with another circuit, or may be provided in another chip or on another substrate.

Figure 6:
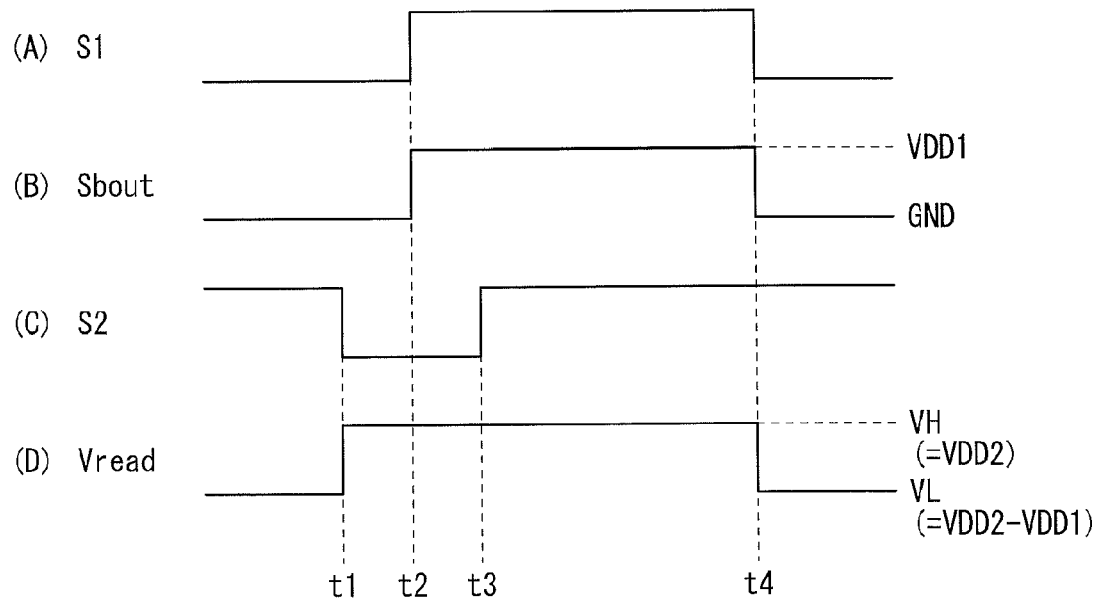
FIG. 6 is a timing waveform chart illustrating an operation example of the driver illustrated in FIG. 5.

FIG. 6 illustrates exemplary timing waveforms of the driver 36, where (A) illustrates a waveform of the signal S1, (B) illustrates a waveform of the signal Sbout, (C) illustrates a waveform of the signal S2, and (D) illustrates a waveform of the row scan signal Vread.

First, at timing t1, the signal S2 is changed from a high level to a low level ((C) of FIG. 6). As a result, the transistor 43 is changed from an OFF state into an ON state, and thus the row scan signal Vread is set to the voltage VDD2 (high-level voltage VH) ((D) of FIG. 6).

Subsequently, at timing t2, the signal S1 is changed from a low level to a high level ((A) of FIG. 6). As a result, the output signal Sbout from the buffer circuit 41 is changed from a low level (the ground voltage GND) to a high level (the voltage VDD1) ((B) of FIG. 6). During this operation, the transistor 43 is maintained to be ON, and thus the row scan signal Vread is maintained at the voltage VDD2 ((D) of FIG. 6).

Subsequently, at timing t3, the signal S2 is changed from the low level to the high level ((C) of FIG. 6). As a result, the transistor 43 is changed from the ON state into the OFF state, and output of the driver 36 is thus floated, and therefore the row scan signal Vread is maintained at the voltage VDD2 ((D) of FIG. 6).

Subsequently, at timing t4, the signal S1 is changed from the high level to the low level ((A) of FIG. 6). As a result, the output signal Sbout from the buffer circuit 41 is changed from the high level (the voltage VDD1) to the low level (the ground voltage GND) ((B) of FIG. 6). Accordingly, the row scan signal Vread is changed from the high-level voltage VH (voltage VDD2) to a low-level voltage VL (voltage VDD2-voltage VDD1) ((D) of FIG. 6).

In this way, the row scan signal Vread rises upon falling of the signal S2, and falls upon falling of the signal S1.

As illustrated in FIG. 1, the A/D conversion section 14 includes a plurality of column selection sections 17, which are provided by one for a plurality of (in this case, four) signal lines Lsig, and performs analog-to-digital conversion (A/D conversion) based on a signal voltage (signal charge) received through the signal lines Lsig. As a result, output data Dout (imaging signal) configured of digital signals is generated, and is output to the outside.

Figure 7:
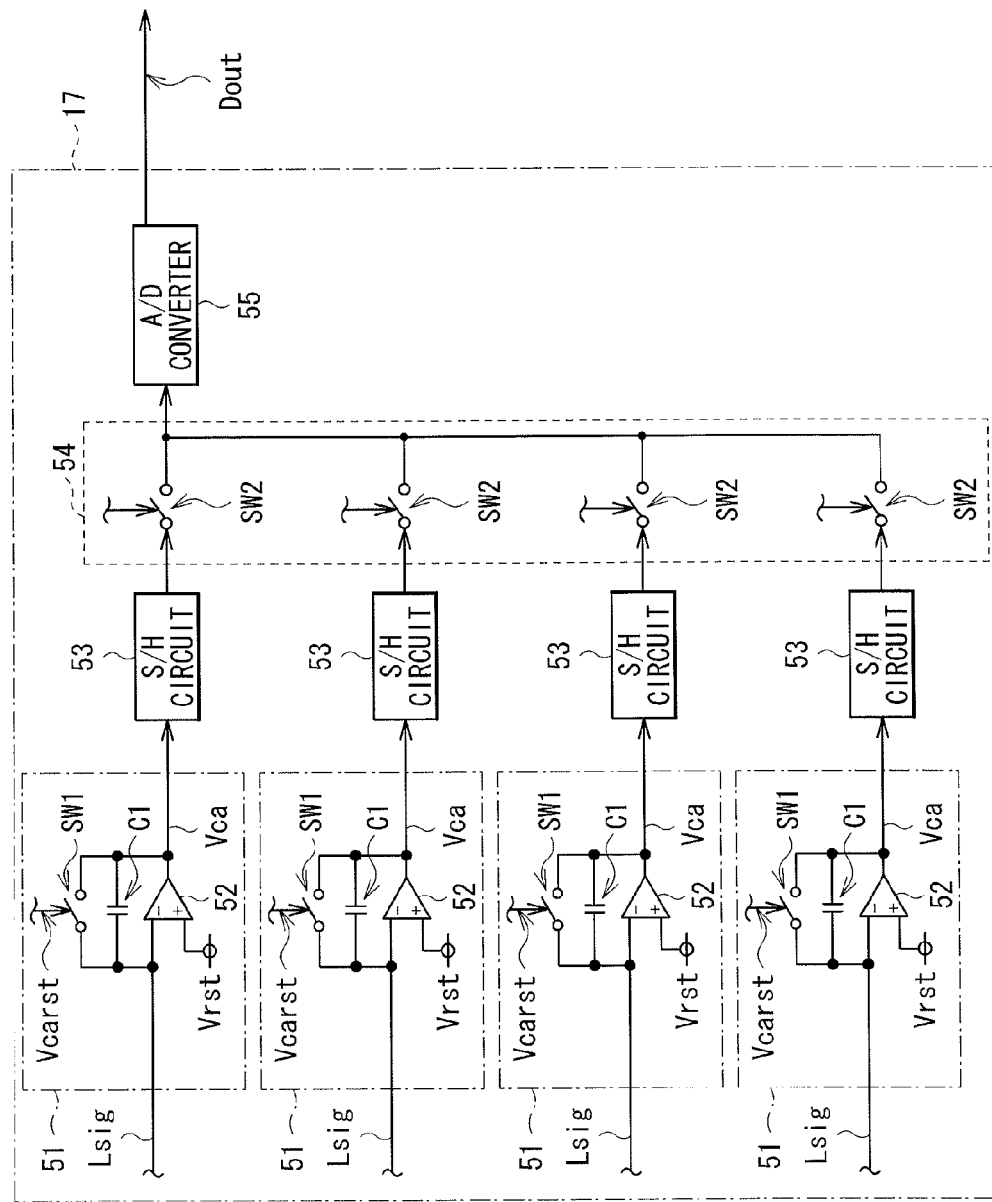
FIG. 7 is a block diagram illustrating an exemplary configuration of a column selection section illustrated in FIG. 1.

FIG. 7 illustrates an exemplary configuration of the column selection section 17. Each of the column selection sections 17 includes charge amplifiers 51, Sample/Hold (S/H) circuits 53, a multiplexer 54, and an A/D converter 55. Among them, the charge amplifiers 51 and the S/H circuits 53 are each provided by one for each signal line Lsig, while the multiplexer 54 and the A/D converter 55 are each provided by one for the column selection section 17 as a whole.

The charge amplifier 51 is an amplifier for conversion of the signal charge read from the signal line Lsig to a voltage (Q-V conversion). The charge amplifier 51 includes an operational amplifier 52, a capacitor C1, and a switch SW1. The operational amplifier 52 has a negative (−) input terminal that is connected to the signal line Lsig, and a positive (+) input terminal that receives a predetermined reset voltage Vrst. Feedback connection is made between the output terminal and the negative input terminal of the operational amplifier 52 through a parallel connection circuit including the capacitor C1 and the switch SW1. Specifically, a first terminal of the capacitor C1 is connected to the negative input terminal of the operational amplifier 52, and a second terminal thereof is connected to the output terminal of the operational amplifier 52. Similarly, a first terminal of the switch SW1 is connected to the negative input terminal of the operational amplifier 52, and a second terminal thereof is connected to the output terminal of the operational amplifier 52. An ON/OFF state of the switch SW1 is controlled by a control signal (an amplifier reset control signal Vcarst) supplied from the system control section 16. The charge amplifier 51 converts the signal charge into the voltage through such a configuration, and outputs the converted voltage Vca.

The S/H circuit 53, which is disposed at a downstream of the charge amplifier 51, is a circuit that temporarily holds the voltage Vca output from the charge amplifier 51.

The multiplexer 54 is a circuit that time-divisionally selects an output signal from each S/H circuit 53 and outputs the selected output signal. The multiplexer 54 has four switches SW2. Respective first terminals of the four switches SW2 are connected to respective output terminals of the four S/H circuits 53, and respective second terminals of the four switches SW2 are connected to one another, and connected to an output terminal of the multiplexer 54. Such four switches SW2 are controlled to be sequentially turned on in accordance with scan drive by the column scan section 15.

The A/D converter 55 is a circuit that performs A/D conversion based on an output voltage from the multiplexer 54 to generate output data Dout, and outputs the output data Dout.

For example, the column scan section 15 may include undepicted components such as a shift register and an address decoder, and scans to sequentially drive the switches SW2 in the column selection section 17. Through such selective scan by the column scan section 15, signals (output data Dout) from the respective pixels 20 read through the respective signal lines Lsig are sequentially output to the outside.

The buffer circuit 41 corresponds to a specific but not limitative example of "signal generation section" of the disclosure. The capacitor 42 corresponds to a specific but not limitative example of "voltage holding section" of the disclosure. The transistor 43 corresponds to a specific but not limitative example of "voltage setting section" of the disclosure. The voltage VDD1 corresponds to a specific but not limitative example of "first voltage" of the disclosure. The ground voltage GND corresponds to a specific but not limitative example of "second voltage" of the disclosure. The voltage VDD2 corresponds to a specific but not limitative example of "third voltage" of the disclosure.

Operation and Functions

Operation and functions of the image pickup unit 1 of the first embodiment are now described.

Summary of Overall Operation

First, summary of overall operation of the image pickup unit 1 is described with reference to FIGS. 1 to 7. In the image pickup unit 1, as illustrated in FIG. 2, when image pickup light Lin enters the image pickup section 11, the photoelectric conversion layer 111 (the photoelectric conversion element 21 in each pixel 20 illustrated in FIG. 3) converts the image pickup light Lin into signal charge (photoelectric conversion). A voltage of the accumulation node N1 is varied in correspondence to accumulation node capacitance Cs due to the signal charge generated through the photoelectric conversion. Specifically, when the signal charge accumulated in the accumulation node capacitance Cs is denoted as q, the voltage of the accumulation node N1 decreases by a level corresponding to q/Cs. In response to such a variation in voltage, an input voltage Vin (voltage corresponding to the signal charge) is applied to the drain of the transistor 22. When the transistor 22 is turned on in response to the row scan signal Vread supplied from the read control line Lread, electric charge corresponding to the input voltage Vin is read from the pixel 20 to the signal line Lsig.

The signal charge read in the above way is input to the column selection section 17 in the A/D conversion section 14 through the signal line Lsig for every a plurality of (in this exemplary case, four) pixel arrays. In the column selection section 17, first, the charge amplifier 51 performs Q-V conversion (conversion from the signal charge to a signal voltage) every time when the signal charge is received from each signal line Lsig. Subsequently, the converted signal voltage (voltage Vca) is sequentially supplied to the A/D converter 55 through the S/H circuit 53 and the multiplexer 54. Then, the A/D converter 55 performs A/D conversion on the voltage Vca, and thus generates the output data Dout (imaging signal) including a digital signal. In this way, the column selection section 17 sequentially outputs the output data Dout that is then transmitted to the outside.

Detailed Operation of Image Pickup Unit 1

Figure 8:
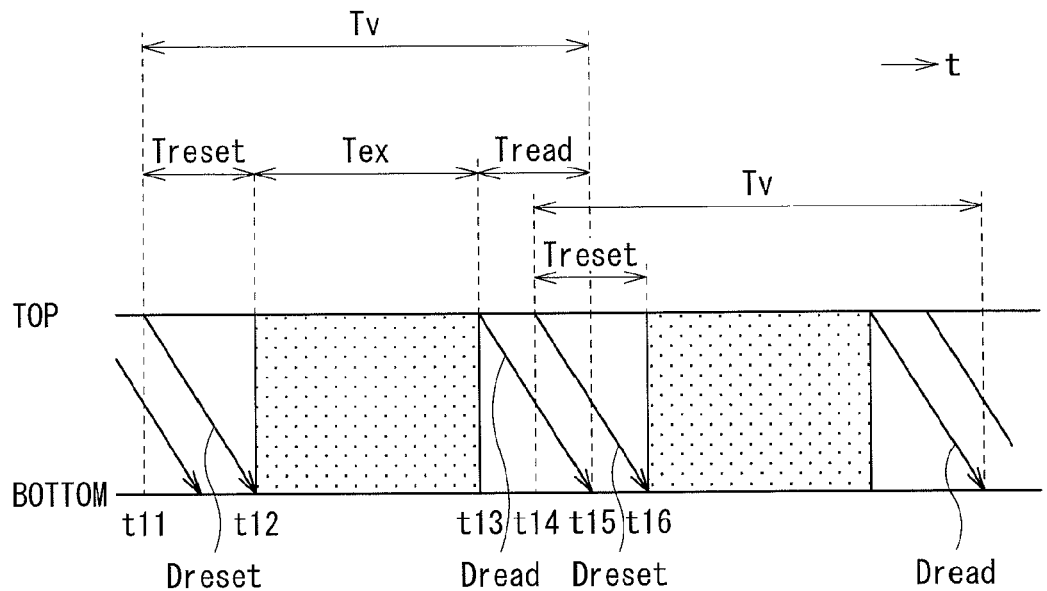
FIG. 8 is a schematic diagram illustrating an operation example of the image pickup unit illustrated in FIG. 1.

FIG. 8 illustrates a timing diagram of scan operation by the image pickup unit 1. A vertical axis indicates a position in a scan direction (V direction).

At timing t11, one vertical period Tv is started. First, in a period from timing t11 to timing t12 (reset scan period Treset), the image pickup unit 1 sequentially performs reset drive Dreset so that the individual pixels 20 in the image pickup section 11 are line-sequentially scanned to be reset (pixel reset operation).

Figure 9:
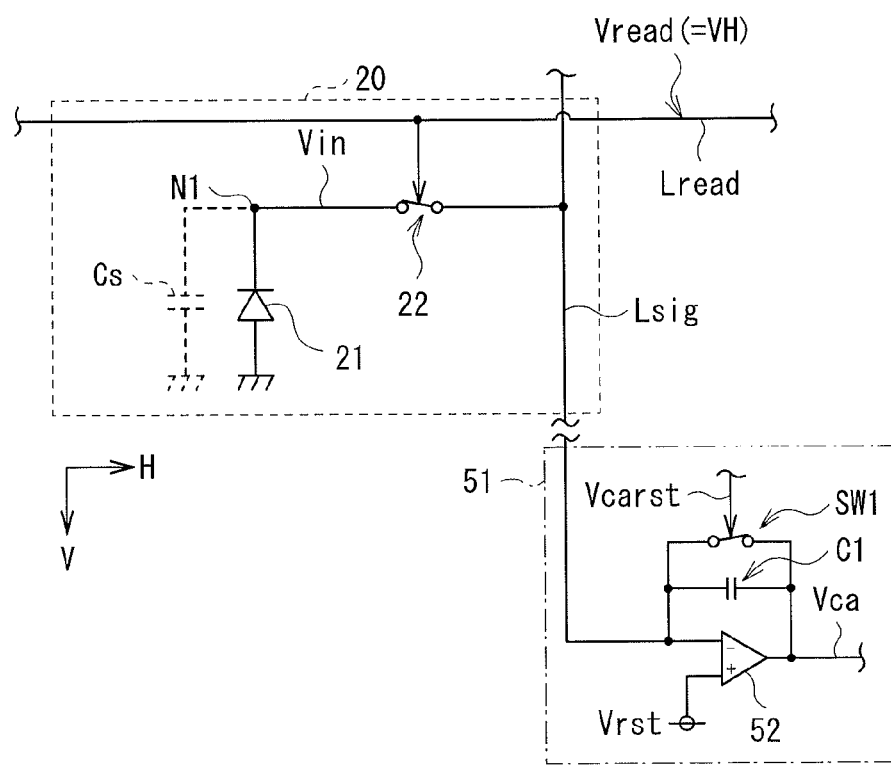
FIG. 9 is an explanatory diagram illustrating an operation state of the image pickup unit illustrated in FIG. 1.

FIG. 9 illustrates a state of the pixel 20 to be subjected to the reset drive Dreset and a state of the corresponding charge amplifier 51. In this drawing, the transistor 22 is illustrated as a switch in an ON or OFF state for convenience of description. In this pixel 20, the row scan signal Vread having the high level (high level voltage VH) is applied to the read control line Lread, upon which the transistor 22 is turned on. In the charge amplifier 51, the switch SW1 is turned on in response to the amplifier reset control signal Vcarst. As a result, a voltage across the capacitor C1 is reset (amplifier reset operation). During this operation, the charge amplifier 51 serves as a voltage follower circuit performing feedback operation by which a voltage at the negative input terminal (terminal connected to the signal line Lsig) of the operational amplifier 52 becomes substantially equal to the reset voltage Vrst applied to the positive input terminal. The reset voltage Vrst is supplied to the accumulation node N1 through the signal line Lsig and the transistor 22. Consequently, an accumulation node voltage Vn of the pixel 20 is set to the reset voltage Vrst (pixel reset operation).

Subsequently, in a period from timing t12 to timing t13 (an exposure period Tex), the pixels 20 in the image pickup section 11 are exposed.

Figure 10:
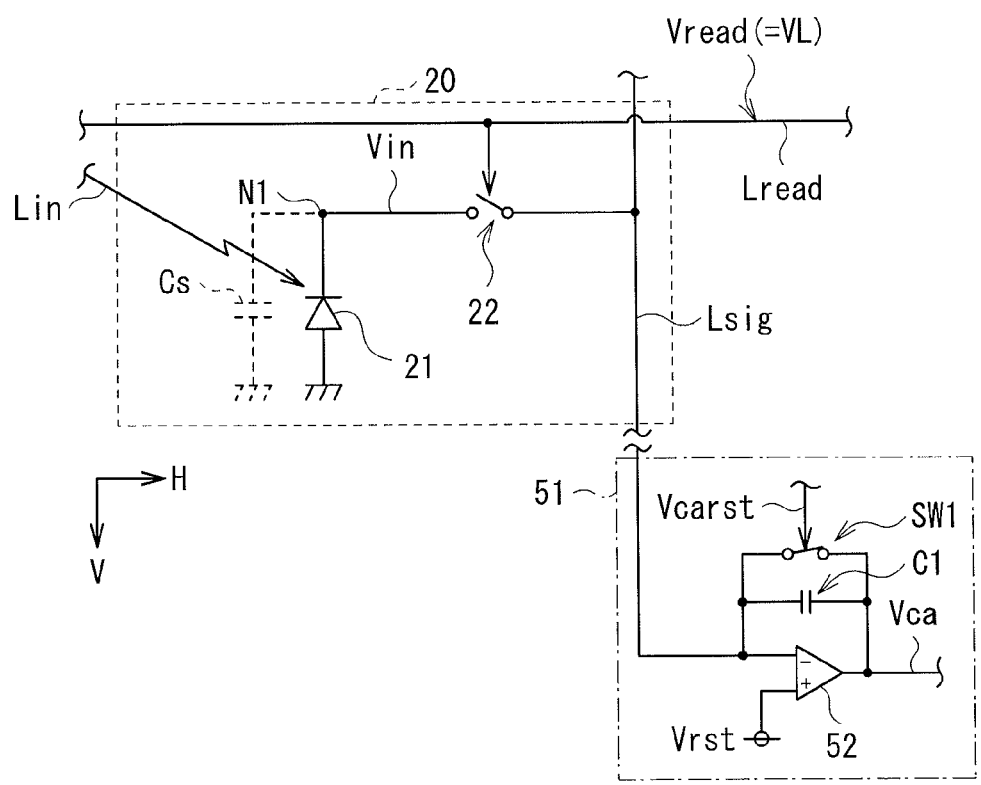
FIG. 10 is an explanatory diagram illustrating another operation state of the image pickup unit illustrated in FIG. 1.

FIG. 10 illustrates a state of each of the pixel 20 and the corresponding charge amplifier 51 in the exposure period Tex. In the exposure period Tex, in each pixel 20, the row scan signal Vread having the low level (low level voltage VL) is applied to the read control line Lread, upon which the transistor 22 is turned off. As a result, when image pickup light Lin enters the photoelectric conversion element 21 in the pixel 20, signal charge corresponding to the image pickup light Lin is accumulated in the accumulation node capacitance Cs. In the charge amplifier 51, during the exposure period Tex, the switch SW1 is maintained to be ON in response to the amplifier reset control signal Vcarst. Consequently, the capacitor C1 is maintained in a reset state, and the charge amplifier 51 continuously serves as a voltage follower circuit.

Subsequently, in a period from timing t13 to timing t15 (read scan period Tread), the image pickup unit 1 sequentially performs read drive Dread, and thus sequentially reads the signal charge from each of the pixels 20 in the image pickup section 11.

Figure 11:
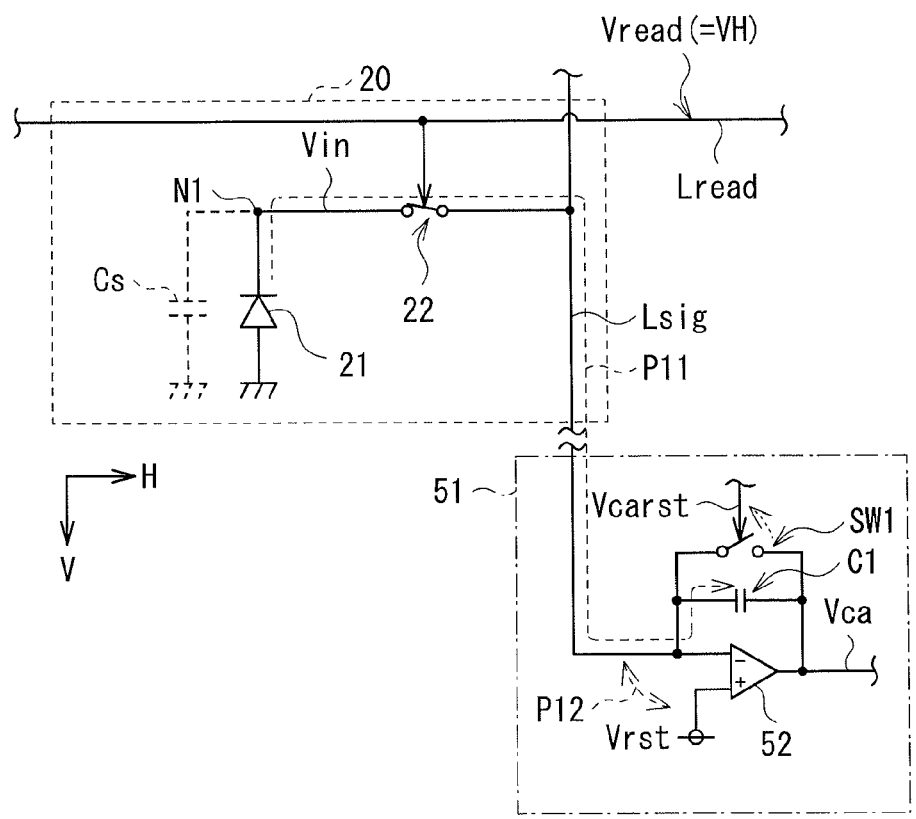
FIG. 11 is an explanatory diagram illustrating still another operation state of the image pickup unit illustrated in FIG. 1.

FIG. 11 illustrates a state of the pixel 20 to be subjected to the read drive Dread and a state of the corresponding charge amplifier 51. In this pixel 20, the row scan signal Vread having the high level (high level voltage VH) is applied to the read control line Lread, upon which the transistor 22 is turned on. In the charge amplifier 51, the switch SW1 is turned off in response to the amplifier reset control signal Vcarst. As a result, first, signal charge is read from the accumulation node capacitance Cs in the pixel 20 toward the signal line Lsig (see an arrow P11 in the drawing), and is eventually received by the charge amplifier 51. Since the switch SW1 is OFF, the signal charge received by the charge amplifier 51 is accumulated in the capacitor C1, and a signal voltage (voltage Vca) corresponding to the accumulated charge is output from the charge amplifier 51. In this way, the charge amplifier 51 performs conversion of the signal charge to a signal voltage (Q-V conversion).

During this read drive Dread, the accumulation node voltage Vn of the pixel 20 is set to the reset voltage Vrst through the signal line Lsig and the transistor 22. Specifically, in the charge amplifier 51, virtual short occurs through the feedback operation, and thus a voltage at the negative input terminal (terminal connected to the signal line Lsig) of the operational amplifier 52 becomes substantially equal to the reset voltage Vrst applied to the positive input terminal. The reset voltage Vrst is supplied to the accumulation node N1 through the signal line Lsig and the transistor 22. Consequently, the accumulation node voltage Vn of the pixel 20 is set to the reset voltage Vrst. Specifically, in the read drive Dread, each of the pixels 20 in the image pickup section 11 is reset (pixel reset operation) while the signal charge is read from the pixel 20.

At timing t15, the one vertical period Tv is finished.

In the image pickup unit 1, a subsequent vertical period Tv is started at certain timing such that the subsequent vertical period Tv partially overlaps with the one vertical period Tv. Specifically, in the image pickup unit 1, the reset scan period Treset in the subsequent vertical period Tv is started at timing t14 in the read scan period Tread from timing t13 to timing t15. Through the reset drive Dreset (FIG. 9), the accumulation node voltage Vn in the pixel 20 is set to the reset voltage Vrst (pixel reset operation), and the charge accumulated in the capacitor C1 through the prior read drive Dread is reset upon turn-on of the switch SW1 (amplifier reset operation).

Reduction in Residual Charge in Pixel 20

In this way, the image pickup unit 1 performs first pixel reset operation in certain read drive Dread, and performs second pixel reset operation in subsequent reset drive Dreset. As a result, even if part of the signal charge, which is accumulated before the first reset operation in the read drive Dread, remains as residual charge in the pixel 20 after the first reset operation, the residual charge is decreased by the second reset operation in the subsequent reset drive Dreset. This makes it possible to reduce a possibility of degradation in quality of a captured image by an afterimage due to the residual charge. Such a reduction in residual charge is now described in detail.

Figure 12:
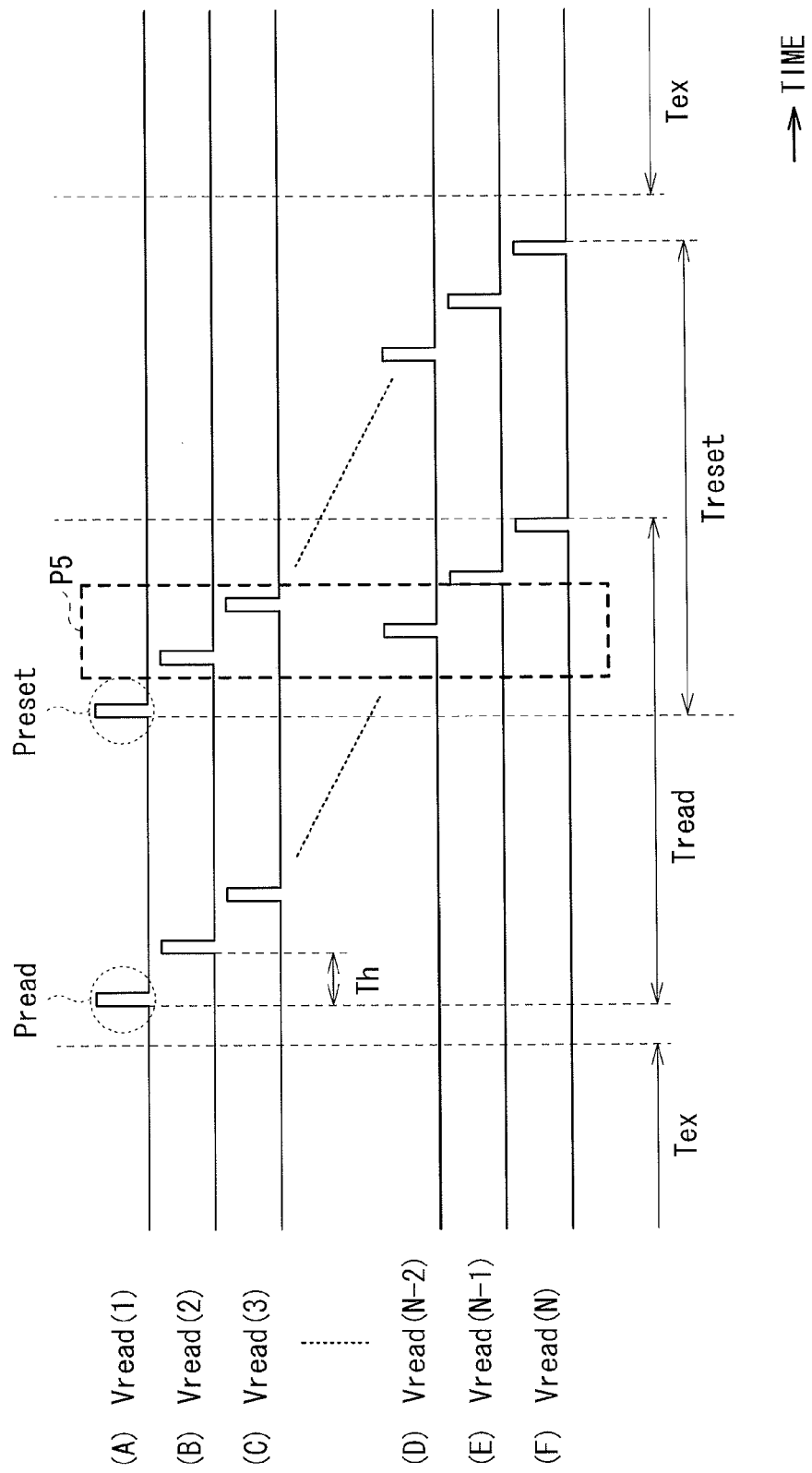
FIG. 12 is a timing waveform chart illustrating an operation example of the row scan section illustrated in FIG. 1.

FIG. 12 illustrates an example of a timing waveform chart of the row scan signal Vread during the read drive Dread and the reset drive Dreset. In detail, FIG. 12 illustrates operation in a period from timing t13 to timing t16 illustrated in FIG. 8. In FIG. 12, (A) to (C) illustrate waveforms of row scan signals Vread(1) to Vread(3) on three read control lines Lread(1) to Lread(3), respectively, near the top of the image pickup section 11, and (D) to (F) illustrate waveforms of row scan signals Vread(N−2) to Vread(N) on three read control lines Lread(N−2) to Lread(N), respectively, near the bottom of the image pickup section 11.

As illustrated in FIG. 12, the row scan section 13 performs the read drive Dread in the read scan period Tread, and sequentially applies pulses Pread as Vread(1) to Vread(N) to the read control lines Lread(1) to Lread(N). Similarly, the row scan section 13 performs the reset drive Dreset in the reset scan period Treset, and sequentially applies pulses Preset as Vread(1) to Vread(N) to the read control lines Lread(1) to Lread(N).

Figure 13:
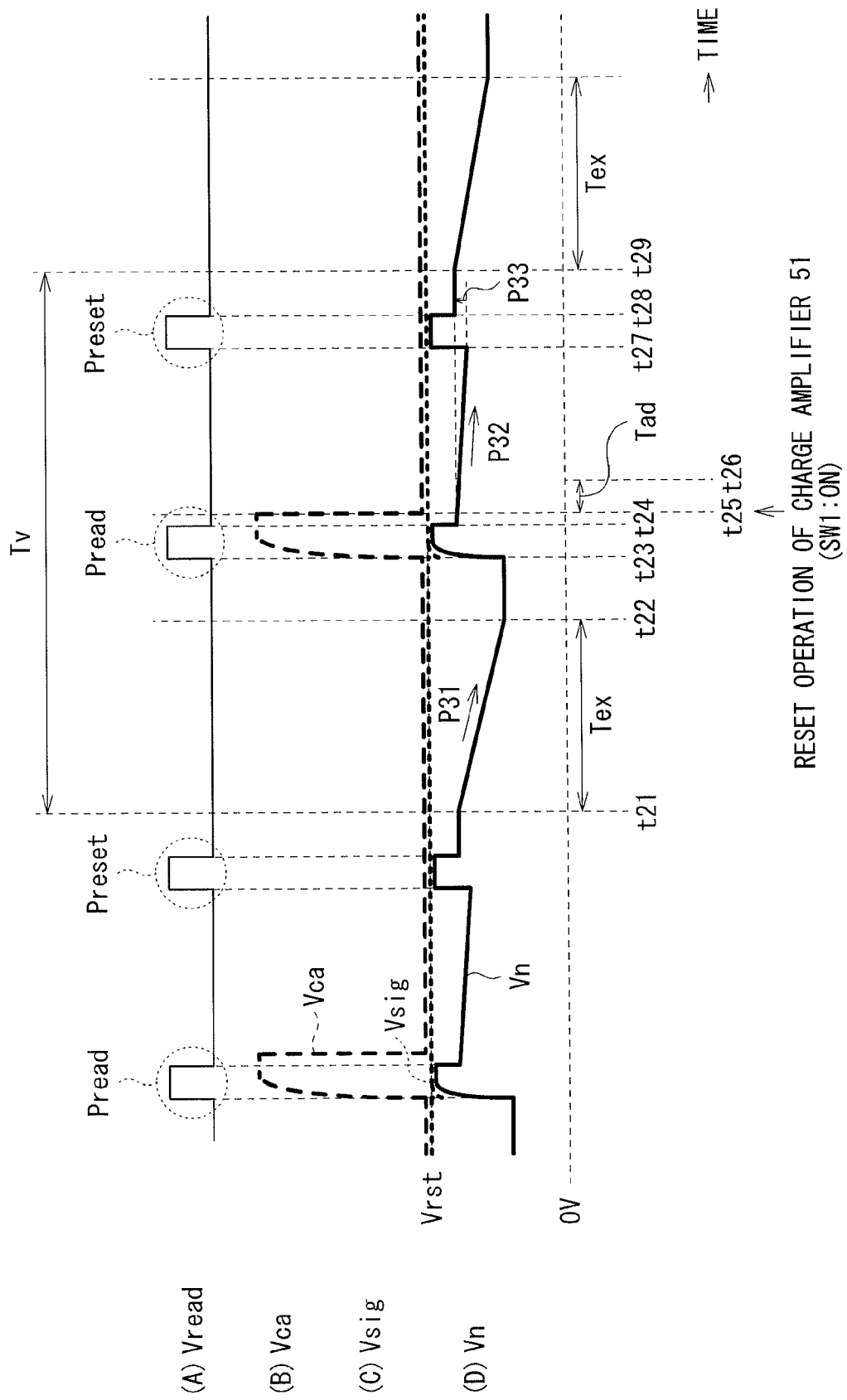
FIG. 13 is a timing waveform chart illustrating an operation example of the image pickup unit illustrated in FIG. 1.

FIG. 13 illustrates a timing chart of operation of a certain pixel 20, where (A) illustrates a waveform of the row scan signal Vread, (B) illustrates a waveform of the output voltage Vca from the charge amplifier 51, (C) illustrates a waveform of the voltage Vsig of the signal line Lsig, and (D) illustrates a waveform of the accumulation node voltage Vn. In detail, FIG. 13 illustrates operation of the pixel 20 in a period containing one vertical period Tv.

In the vertical period Tv, first, exposure operation is performed as illustrated in FIG. 10 in an exposure period Tex from timing t21 to timing t22. Specifically, when image pickup light Lin enters the image pickup section 11, the photoelectric conversion element 21 in each pixel 20 converts the image pickup light Lin into signal charge (photoelectric conversion). The signal charge is then accumulated in the accumulation node capacitance Cs in the pixel 20, so that the accumulation node voltage Vn is gradually varied (see an arrow P31 in FIG. 13).

Subsequently, read drive Dread is performed as illustrated in FIG. 11 in a period from timing t23 to timing t24. Specifically, read operation of the signal charge from the pixel 20 and first pixel reset operation for resetting the signal charge in the pixel 20 are substantially concurrently performed. The signal charge read from the pixel 20 is subjected to Q-V conversion in the charge amplifier 51, and is output as the voltage Vca. The S/H circuit 53 temporarily holds the voltage Vca.

Subsequently, the switch SW1 in the charge amplifier 51 is turned on at timing t25, upon which charge accumulated in the capacitor C1 is reset. In other words, reset operation of the charge amplifier 51 (amplifier reset operation) is performed.

Subsequently, in a period from timing t25 to timing t26 (signal conversion period Tad), the multiplexer 54 and the A/D converter 55 sequentially convert the voltages Vca held by the S/H circuits 53 into digital signals, and output the digital signals as output data Dout.

In a period from timing t24 to timing t27, as indicated by an arrow P32 in FIG. 13, the accumulation node voltage Vn gradually decreases after the first pixel reset operation. Such a decrease in accumulation node voltage is due to generation of residual charge.

Subsequently, reset drive Dreset is performed as illustrated in FIG. 9 in a period from timing t27 to timing t28. Specifically, second pixel reset operation for resetting the signal charge in the pixel 20 is performed.

In this way, a plurality of (in this exemplary case, two) times of pixel reset operation are intermittently performed within one vertical period Tv in the image pickup unit 1. This results in more secure reset of the residual charge (residual amount of the signal charge) in the pixel 20 after the first pixel reset operation, and consequently such residual charge is reduced (see an arrow P33 shown in FIG. 13).

It is desirable that such a plurality of times of pixel reset operation (line-sequential reset drive) be intermittently performed over a period more than one horizontal period (one horizontal scan period: about 32 μs, for example), for example. The reason for this is as follows. Specifically, for example, about several hundred microseconds may be taken for transition of a state of a PIN photodiode. Hence, it may be believed that the reset voltage Vrst is continuously or intermittently applied to the accumulation node N1 for about 100 μs, for example, thereby achieving a reduction in generation of the residual charge. Actually, it has been found from experiments etc. that when the application period of the reset voltage Vrst exceeds one horizontal period (for example, about 32 μs), a significant decrease in residual charge occurs.

Reduction in Noise in Row Scan Signal Vread

As described with reference to FIG. 12 etc., the image pickup unit 1 performs scan drive through sequentially applying the pulses Pread to the read control lines Lread in the read scan period Tread, and sequentially applying the pulses Preset to the read control lines Lread in the reset scan period Treset. In this mode, since the drive circuit 33 is configured to generate the low-noise row scan signal Vread, quality of a captured image is improved. Detailed description is now made on a reduction in noise in the row scan signal Vread.

First, operation of the row scan section 13 is described prior to description of a reduction in noise in the row scan signal Vread.

Figure 14:
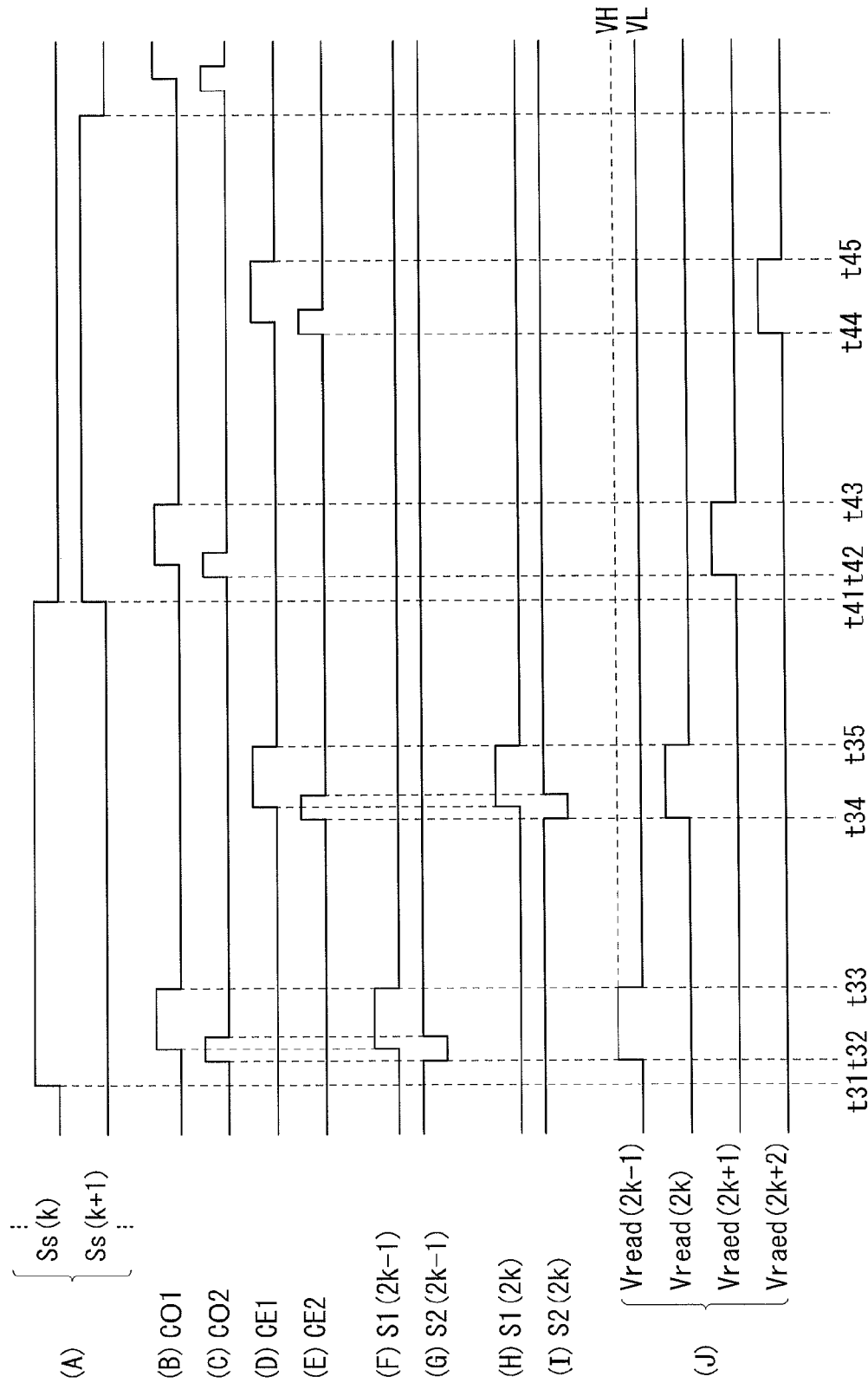
FIG. 14 is a timing waveform chart illustrating an operation example of the row scan section illustrated in FIG. 1.

FIG. 14 illustrates an example of a timing waveform chart of operation of the row scan section 13, where (A) illustrates a waveform of the scan signal Ss, (B) to (E) illustrate waveforms of the control signals CO1, CO2, CE1, and CE2, respectively, (F) and (G) illustrate waveforms of a signal S1 (signal S1(2*k*−1)) and a signal S2 (signal S2(2*k*−1)), respectively, in the drive circuit 33(2*k*−1), (H) and (I) illustrate waveforms of a signal S1 (signal S1(2*k*)) and a signal S2 (signal S2(2*k*)), respectively, in the drive circuit 33(2*k*), and (J) illustrates waveforms of the row scan signals Vread.

First, at timing t31, the shift register 32 changes the scan signal Ss(k) from a low level to a high level ((A) of FIG. 14).

Subsequently, the control section 31 outputs pulses as the control signals CO1 and CO2 in a period from timing t32 to timing t33 ((B) and (C) of FIG. 14). Specifically, first, at timing t32, the control section 31 changes the control signal CO2 from a low level to a high level ((C) of FIG. 14). In response to this, the NAND circuit 35(2*k*−1) in the drive circuit 33(2*k*−1) changes the signal S2(2*k*−1) from a high level to a low level ((G) of FIG. 14). Subsequently, the control section 31 changes the control signal CO1 from a low level to a high level ((B) of FIG. 14). In response to this, the AND circuit 34(2*k*−1) in the drive circuit 33(2*k*−1) changes the signal S1(2*k*−1) from a low level to a high level ((F) of FIG. 14). Subsequently, the control section 31 changes the control signal CO2 from the high level to the low level ((C) of FIG. 14). In response to this, the NAND circuit 35(2*k*−1) changes the signal S2(2*k*−1) from the low level to the high level ((G) of FIG. 14). Subsequently, the control section 31 changes the control signal CO1 from the high level to the low level ((B) of FIG. 14). In response to this, the AND circuit 34(2*k*−1) changes the signal S1(2*k*−1) from the high level to the low level ((F) of FIG. 14). As illustrated in FIG. 6, the driver 36(2*k*−1) in the drive circuit 33(2*k*−1) generates the row scan signal Vread(2*k*−1) based on the signals S1(2*k*−1) and S2(2*k*−1) ((J) of FIG. 14).

Subsequently, the control section 31 similarly outputs pulses as the control signals CE1 and CE2 in a period from timing t34 to timing t35 ((D) and (E) of FIG. 14). Specifically, first, the control section 31 changes the control signal CE2 from a low level to a high level ((E) of FIG. 14). In response to this, the NAND circuit 35(2*k*) in the drive circuit 33(2*k*) changes the signal S2(2*k*) from a high level to a low level ((I) of FIG. 14). Subsequently, the control section 31 changes the control signal CE1 from a low level to a high level ((D) of FIG. 14). In response to this, the AND circuit 34(2*k*) in the drive circuit 33(2*k*) changes the signal S1(2*k*) from a low level to a high level ((H) of FIG. 14). Subsequently, the control section 31 changes the control signal CE2 from the high level to the low level ((E) of FIG. 14). In response to this, the NAND circuit 35(2*k*) changes the signal S2(2*k*) from the low level to the high level ((I) of FIG. 14). Subsequently, the control section 31 changes the control signal CE1 from the high level to the low level ((D) of FIG. 14). In response to this, the AND circuit 34(2*k*) changes the signal S1(2*k*) from the high level to the low level ((H) of FIG. 14). As illustrated in FIG. 6, the driver 36(2*k*) in the drive circuit 33(2*k*) generates the row scan signal Vread(2*k*) based on the signals S1(2*k*) and S2(2*k*) ((J) of FIG. 14).

Subsequently, at timing t41, the shift register 32 changes the scan signal Ss(k) from the high level to the low level, and changes the scan signal Ss(k+1) from the low level to the high level ((A) of FIG. 14). Then, in a period from timing t42 to timing t43, the control section 31 similarly generates the control signals CO1 and CO2, and the drive circuit 33(2*k*+1) outputs the row scan signal Vread(2*k*+1) ((J) of FIG. 14). Then, in a period from timing t44 to timing t45, the control section 31 similarly generates the control signals CE1 and CE2, and the drive circuit 33(2k+2) outputs the row scan signal Vread(2k+2) ((J) of FIG. 14).

In this way, the row scan section 13 sequentially generates pulses, and outputs the pulses as the row scan signals Vread (1) to Vread(N).

Figure 15:
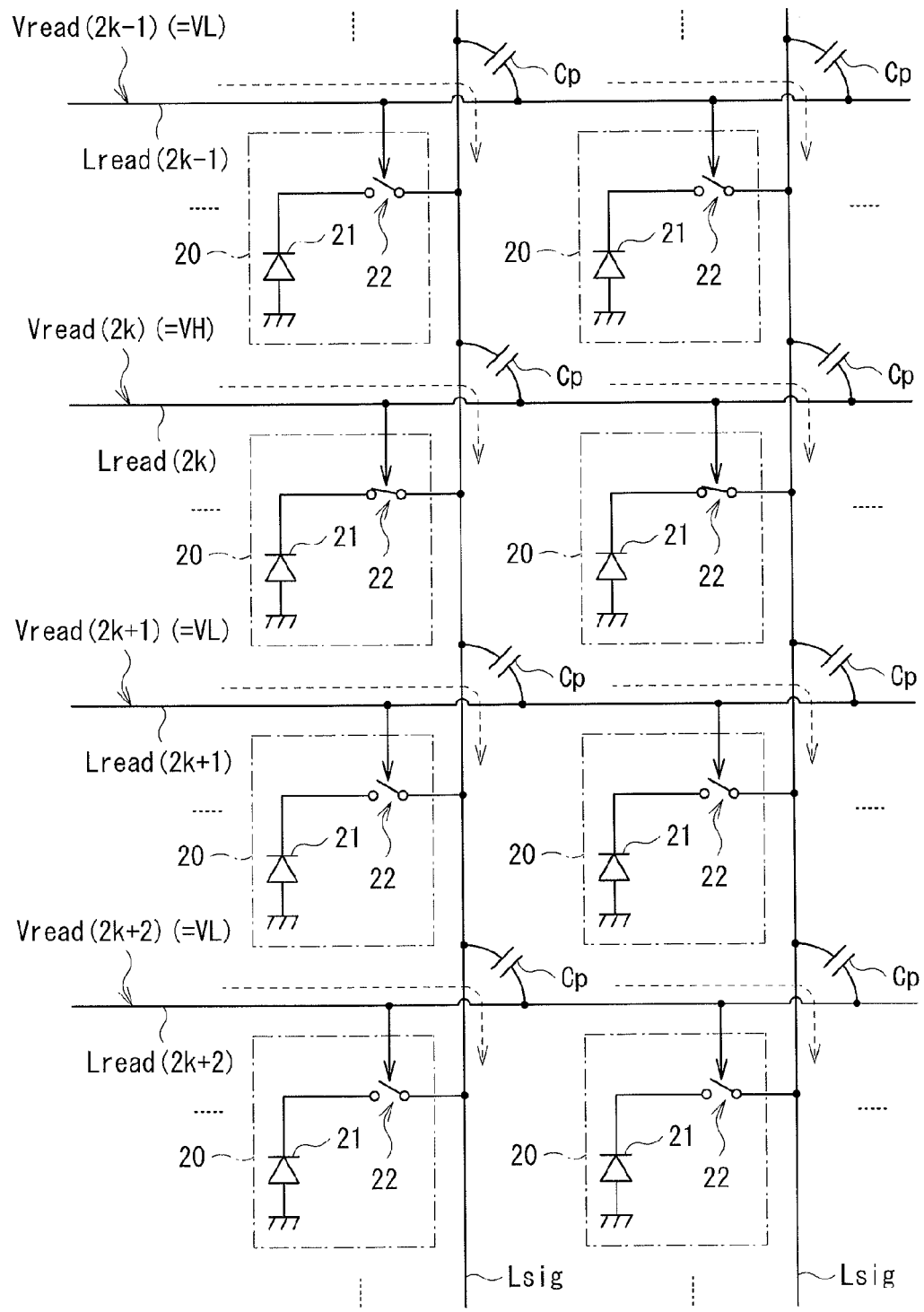
FIG. 15 is an explanatory diagram for explaining coupling between signal lines in the image pickup section illustrated in FIG. 1.

FIG. 15 illustrates transmission of noise in the row scan signal Vread to the signal line Lsig. There are inter-wiring parasitic capacitance Cp and undepicted gate-to-source capacitance Cgs of the transistor 22 between each read control line Lread that transmits the row scan signal Vread and each signal line Lsig. Consequently, noise in each of the signals Vread(1) to Vread(N) is transmitted to the signal line Lsig through such types of capacitance.

At this time, in the image pickup unit 1, the low level of the signal Sbout output by the buffer circuit 41 in the drive circuit 33 is set to the ground voltage GND level, and therefore noise less appears in the signal line Lsig.

Specifically, as illustrated in FIG. 6, in the drive circuit 33, during the period from timing t1 to timing t3, the signal S2 is at the low level, so that the transistor 43 is ON, and the row scan signal Vread is thus set to the voltage VDD2. In other periods, the row scan signal Vread has a waveform similar to that of the signal Sbout. In other words, the low level of the row scan signal Vread corresponds to the low level of the signal Sbout. Specifically, noise in the low-level voltage (ground voltage GND) of the signal Sbout is superposed on the low-level voltage VL of the row scan signal Vread. Since the ground voltage GND is a reference voltage of the system and thus has low noise, the low-level voltage VL of the row scan signal Vread also has low noise.

In addition, as illustrated in FIG. 12 and (J) of FIG. 14, most of the row scan signals Vread are each at the low level (have the low-level voltage VL) except for pulsing lines. Thus, most of the read control lines Lread each receives a low-noise signal. Thus, noise less appears in the signal line Lsig.

Specifically, if the drive circuit 33 has a power circuit that generates the low-level voltage VL and the high-level voltage VH, and if the row scan signal Vread is directly generated using the voltages generated by the power circuit, the low-level voltage VL may have some noise. In such a case, such noise may be transmitted to the signal line Lsig through the parasitic capacitance Cp etc., thereby a signal-to-noise ratio of a signal on the signal line Lsig may be degraded, and quality of a captured image may also be degraded.

In contrast, in the image pickup unit 1, as illustrated in FIG. 5, the signal Sbout, which makes a transition between the voltage VDD1 and the ground voltage GND, is generated, and the signal Sbout is shifted in level by the capacitor 42 to generate the row scan signal Vread, and therefore noise less appears in the low-level voltage VL of the row scan signal Vread, thereby quality of a captured image is improved.

Timing etc. of Each of Read Drive Dread and Reset Drive Dreset

As described with reference to FIG. 13 etc., in the image pickup unit 1, during the signal conversion period Tad after the charge amplifier 51 performs Q-V conversion, the multiplexer 54 and the A/D converter 55 sequentially convert the voltages Vca held by the S/H circuits 53 into digital signals. In the signal conversion period Tad, noise may occur in a power supply voltage due to operation of each of the multiplexer 54 and the A/D converter 55. Specifically, for example, when the switch SW2 in the multiplexer 54 is turned on or off, noise (switching noise) may be likely to occur in a power supply. In addition, the A/D converter 55 has a circuit section that processes digital signals, and is therefore likely to induce power-supply noise. The reason for this is as follows: since a digital signal is produced through switching between two voltage levels (high and low levels), noise having a high-frequency component occurs at timing of such switching between the voltage levels. In the case where an analog power supply and a digital power supply are separately provided, the noise may have certain influence on the analog power supply though the influence may be somewhat suppressed. In particular, since the A/D converter has an analog circuit and a digital circuit that are disposed close to each other, the noise has large influence on the analog power supply. If such noise occurs in the power supply, quality of a captured image may be degraded. Thus, in the image pickup unit 1, a period for the read drive Dread and a period for the reset drive Dreset are each provided so as not to overlap with the signal conversion period Tad.

Figure 16:
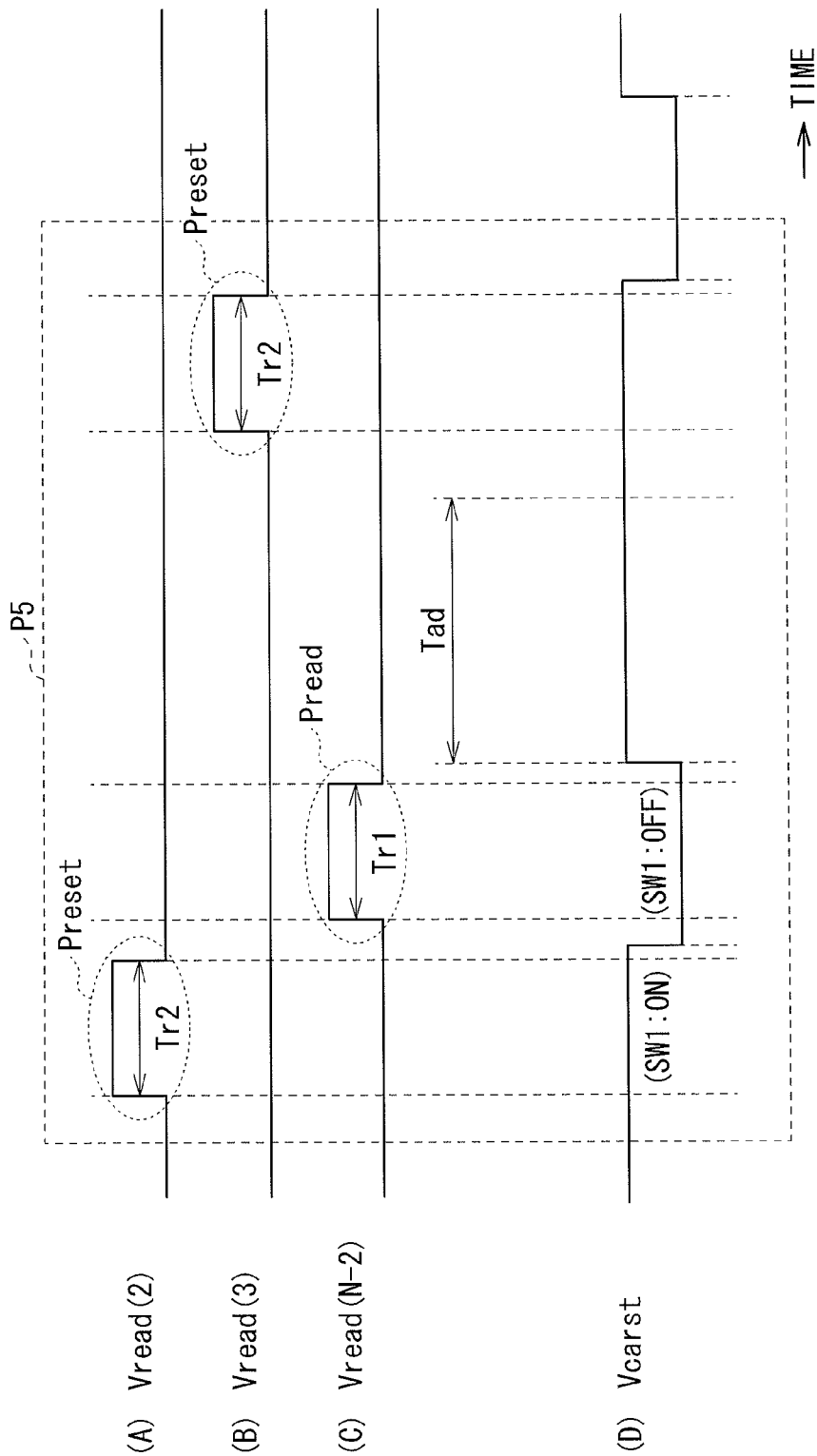
FIG. 16 is a timing waveform chart illustrating an example of drive timing in the image pickup unit illustrated in FIG. 1.

FIG. 16 illustrates timing of each of the read drive Dread and the reset drive Dreset in a section indicated by a sign P5 in FIG. 12, where (A) illustrates a waveform of a row scan signal Vread(2), (B) illustrates a waveform of a row scan signal Vread(3), (C) illustrates a waveform of a row scan signal Vread(N−2), and (D) illustrates a waveform of an amplifier reset control signal Vcarst.

As illustrated in FIG. 16, in the image pickup unit 1, a period Tr1 for the read drive Dread and a period Tr2 for the reset drive Dreset are each provided so as not to overlap with the signal conversion period Tad. As a result, even if noise occurs in power supply voltage due to operation of each of the multiplexer 54 and the A/D converter 55, the noise may less affect the read drive Dread and the reset drive Dreset, thereby making it possible to reduce a possibility of a reduction in quality of a captured image.

Effects

As described above, in the first embodiment, the signal Sbout, which makes a transition between the voltage VDD1 and the ground voltage GND, is generated, and the signal Sbout is shifted in level by the capacitor to generate the row scan signal, and therefore noise in the row scan signal is reduced, which in turn increases a signal-to-noise ratio of a signal on the signal line, so that quality of a captured image is improved.

In addition, in the first embodiment, since a plurality of times of pixel reset operation are intermittently performed within one vertical period, residual charge is reduced, thereby making it possible to reduce a possibility of a reduction in quality of a captured image.

In addition, in the first embodiment, the period for the read drive and the period for the reset drive are each set so as not to overlap with the signal conversion period, thereby making it possible to reduce a possibility of a reduction in quality of a captured image.

Modification 1-1

Figure 17:
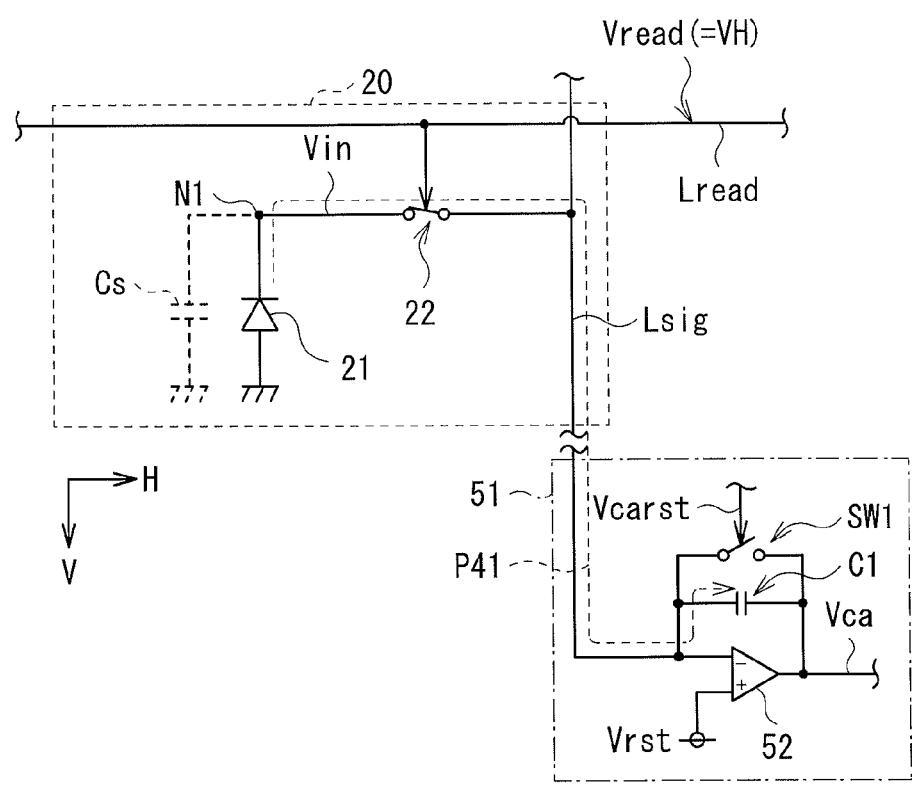
FIG. 17 is an explanatory diagram illustrating an operation state of an image pickup unit according to Modification 1-1 of the first embodiment.
Figure 18:
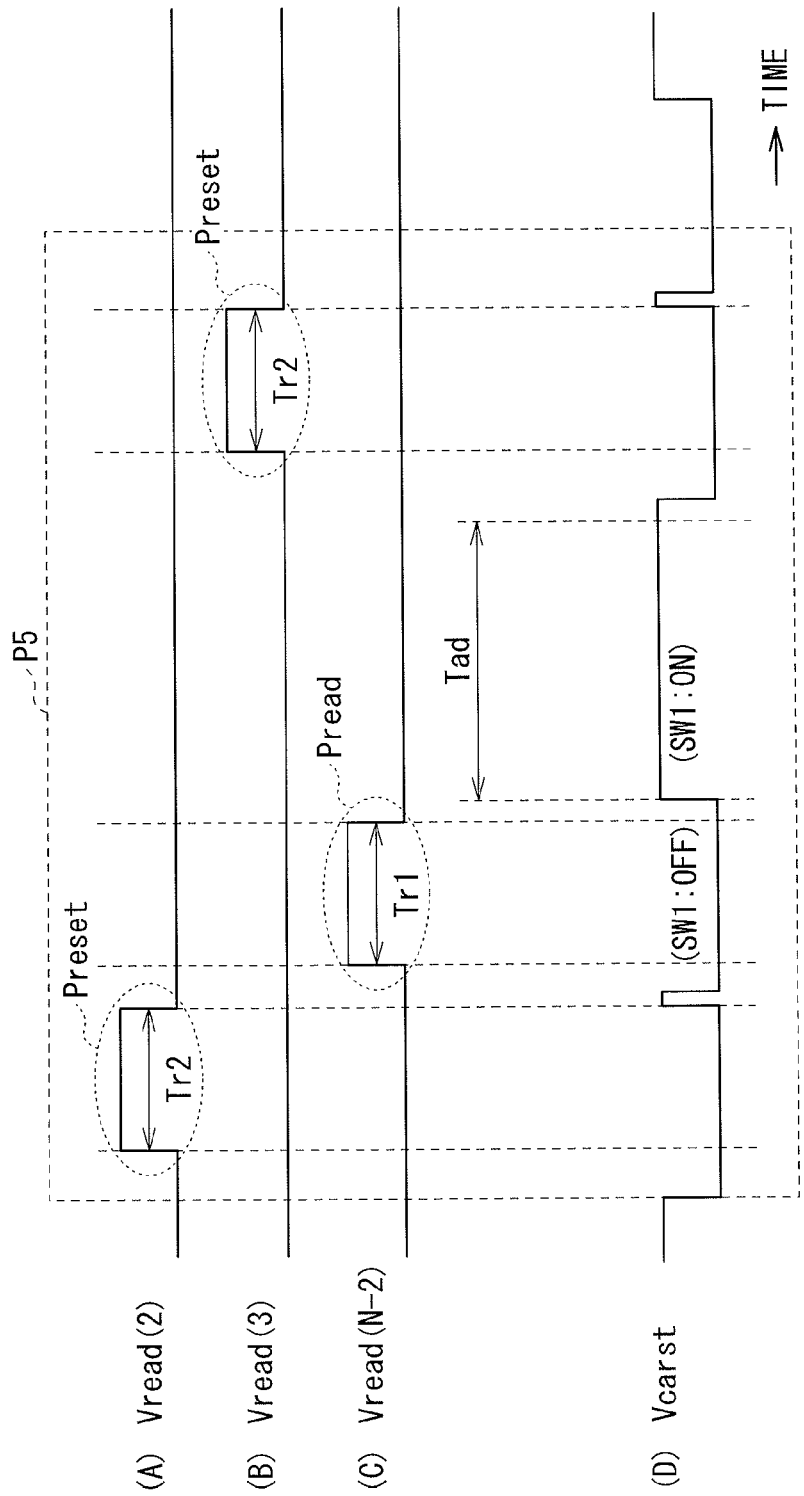
FIG. 18 is a timing waveform chart illustrating an example of drive timing in the image pickup unit according to the Modification 1-1 of the first embodiment.

Although the switch SW1 in the charge amplifier 51 is ON during the reset drive Dreset as illustrated in FIG. 9 in the first embodiment, the operation mode is not limited thereto. Alternatively, for example, as illustrated in FIG. 17, the switch SW1 may be OFF. In such a case, as with the case of the read drive Dread (FIG. 11), it is also possible that the accumulation node voltage Vn of the pixel 20 is set to the reset voltage Vrst through virtual short of the operational amplifier 52. In such a case, as illustrated in FIG. 18, it is also possible that the period Tr1 for the read drive Dread and the period Tr2 for the reset drive Dreset are each set so as not to overlap with the signal conversion period.

In such a case, as with the case of the read drive Dread, since the transistor 22 in the pixel 20 is ON, and the switch SW1 in the charge amplifier 51 is OFF, the charge amplifier 51 is in a read operation state. Specifically, in the Modification 1-1, it is possible that residual charge in the accumulation node capacitance Cs is read by the charge amplifier 51 as indicated by an arrow P41 in the drawing.

Modification 1-2

Although the period Tr1 for the read drive Dread and the period Tr2 for the reset drive Dreset are each set so as not to overlap with the signal conversion period Tad as illustrated in FIG. 16 in the first embodiment, the operation mode is not limited thereto. Alternatively, for example, each of the periods Tr1 and Tr2 may be set so as to partially overlap with the signal conversion period Tad. Modification 1-2 is described in detail below.

Figure 19:
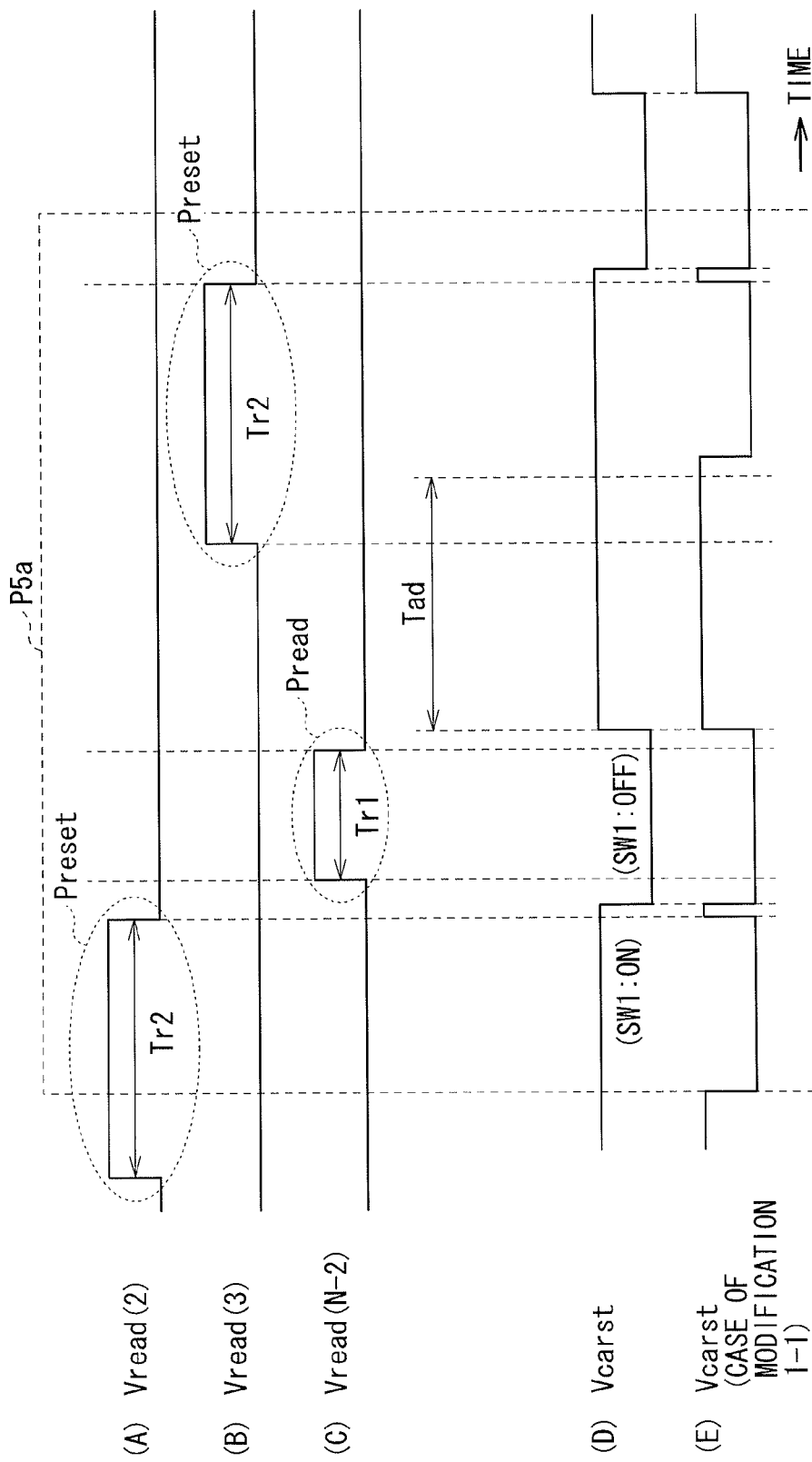
FIG. 19 is a timing waveform chart illustrating an example of drive timing in an image pickup unit according to Modification 1-2 of the first embodiment.

FIG. 19 illustrates timing of each of the read drive Dread and the reset drive Dreset in the Modification 1-2, where (A) illustrates a waveform of a row scan signal Vread(2), (B) illustrates a waveform of a row scan signal Vread(3), (C) illustrates a waveform of a row scan signal Vread(N−2), and (D) and (E) each illustrate a waveform of an amplifier reset control signal Vcarst. In FIG. 19, (D) shows a waveform in the case where the Modification 1-2 is applied to the above-described embodiment, and (E) shows a waveform in the case where the Modification 1-2 is applied to the Modification 1-1.

In this exemplary case, part (a period from start timing to a middle point) of the period Tr2 for the reset drive Dreset overlaps with part of the signal conversion period Tad. However, finish timing of the period Tr1 for the read drive Dread and finish timing of the period Tr2 for the reset drive Dreset are each set so as not to be contained in the signal conversion period Tad. In such a case, influence of power supply noise is also suppressed as described below.

Specifically, if the reset voltage Vrst is fluctuated due to an unstable power supply voltage during the read drive Dread or the reset drive Dreset, the reset voltage Vrst applied to the pixel 20 is also fluctuated through virtual short of the operational amplifier 52. If the pulse Pread or Preset is finished in such a fluctuated state of the reset voltage Vrst (signal conversion period Tad), the transistor 22 in the pixel 20 is turned off with a voltage being unstable, and therefore the accumulation node voltage Vn is varied at every pixel reset operation. Consequently, such a variation in voltage appears as a noise component in an imaging signal, causing a possibility of a reduction in signal-to-noise ratio.

In contrast, in the Modification 1-2, since finish timing of the period Tr1 for the read drive Dread and finish timing of the period Tr2 for the reset drive Dreset are each set so as not to be contained in the signal conversion period Tad, the pulse Pread or Preset is not finished in the fluctuated state of the reset voltage Vrst (signal conversion period Tad), and therefore an imaging signal has a reduced amount of noise component caused by such an unstable reset voltage Vrst.

Modification 1-3

Figure 20:
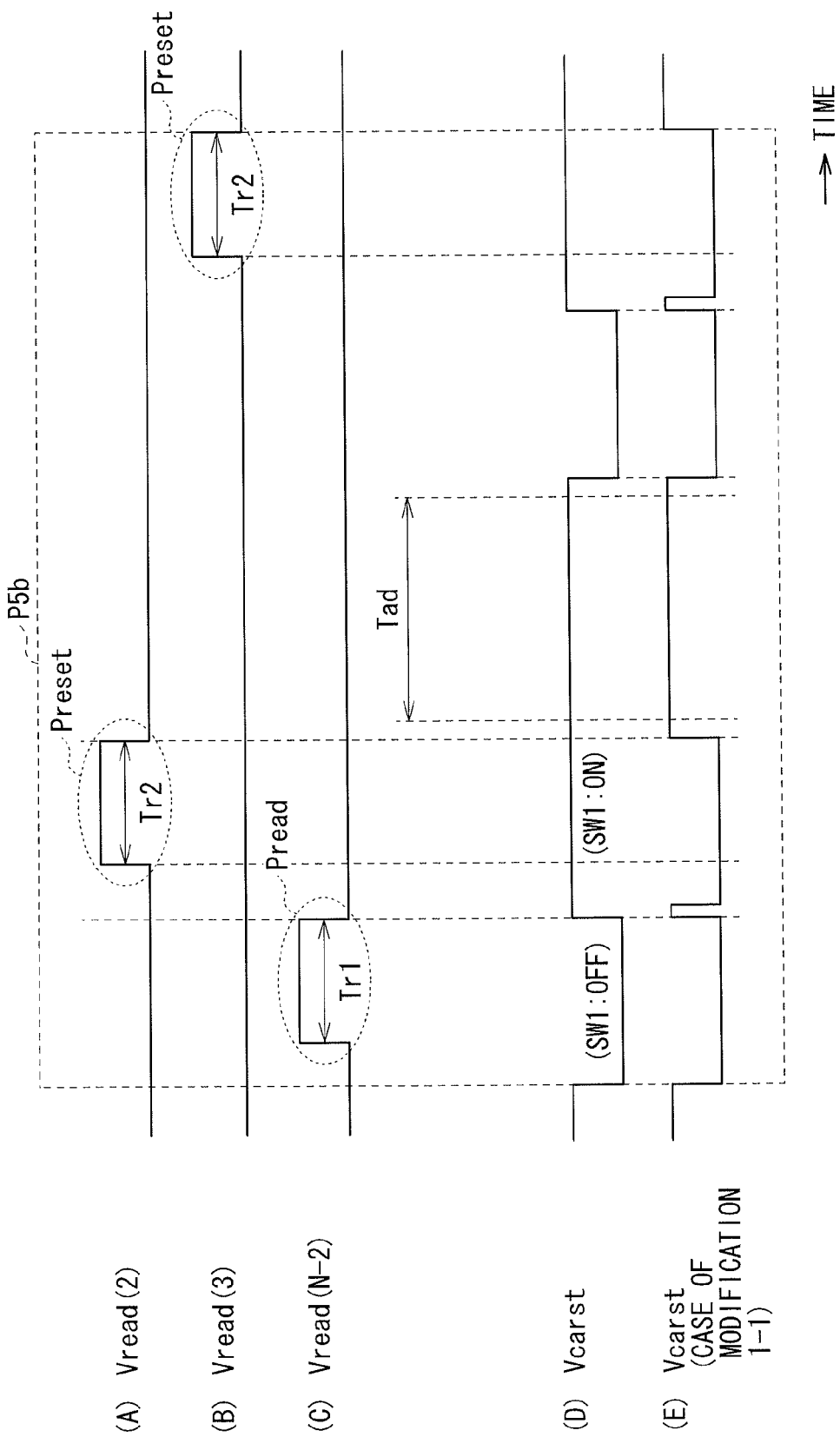
FIG. 20 is a timing waveform chart illustrating an example of drive timing in an image pickup unit according to Modification 1-3 of the first embodiment.
Figure 21:
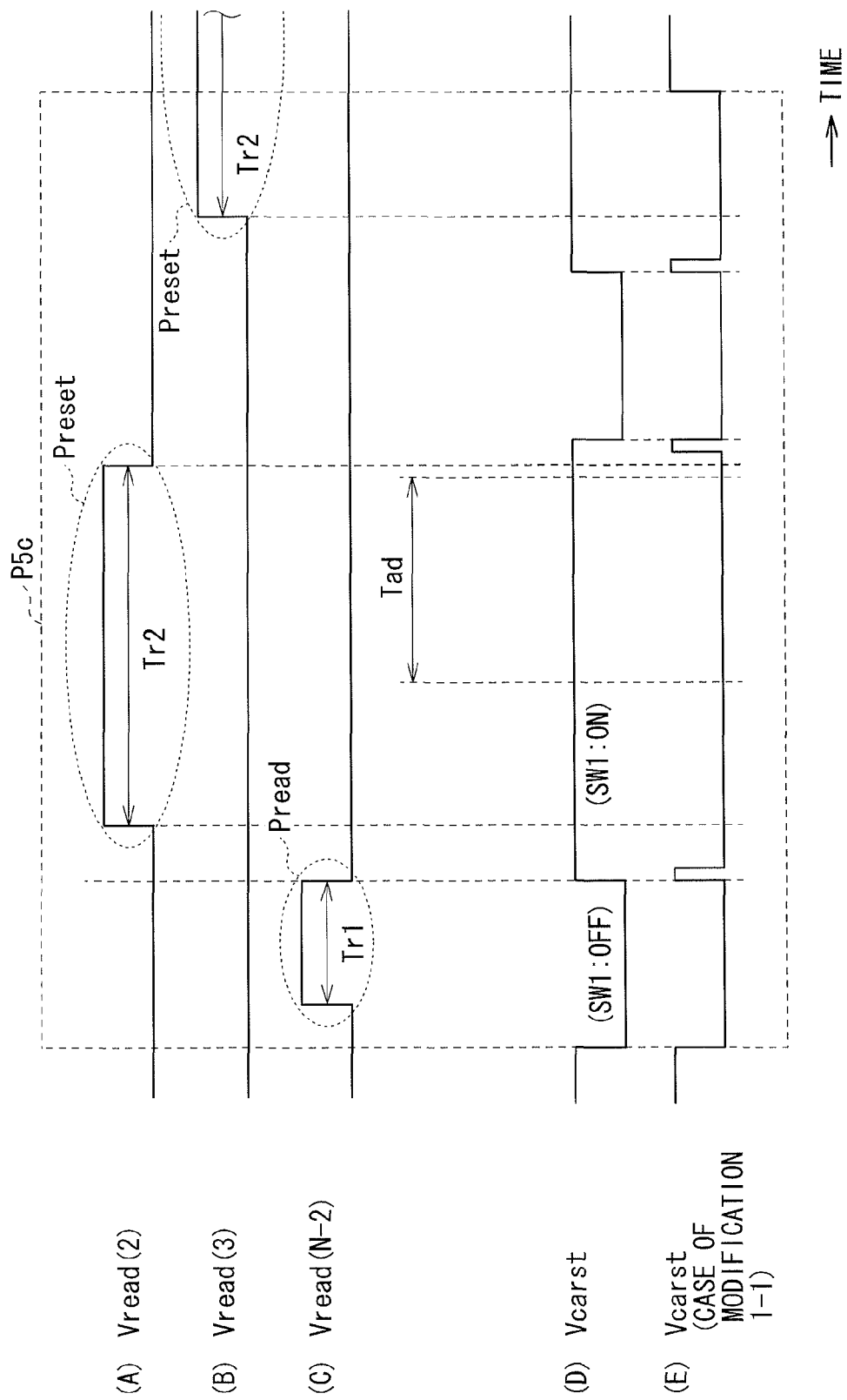
FIG. 21 is a timing waveform chart illustrating an example of drive timing in an image pickup unit according to Modification 1-3 of the first embodiment.

Although the signal conversion period Tad is disposed immediately after the period Tr1 for the read drive Dread as illustrated in FIG. 16 in the first embodiment, the operation mode is not limited thereto. For example, as illustrated in FIG. 20, the period Tr2 for the reset drive Dreset may be disposed after the period Tr1 for the read drive Dread, and may be followed by the signal conversion period Tad. Alternatively, for example, as illustrated in FIG. 21, the period Tr2 for the reset drive Dreset may be disposed after the period Tr1 for the read drive Dread, and the signal conversion period Tad may be provided near the center of the period Tr2.

Modification 1-4

Although part of the read scan period Tread overlaps with part of the reset scan period Treset as illustrated in FIG. 8 in the first embodiment, the operation mode is not limited thereto.

Figures 22A, 22B:
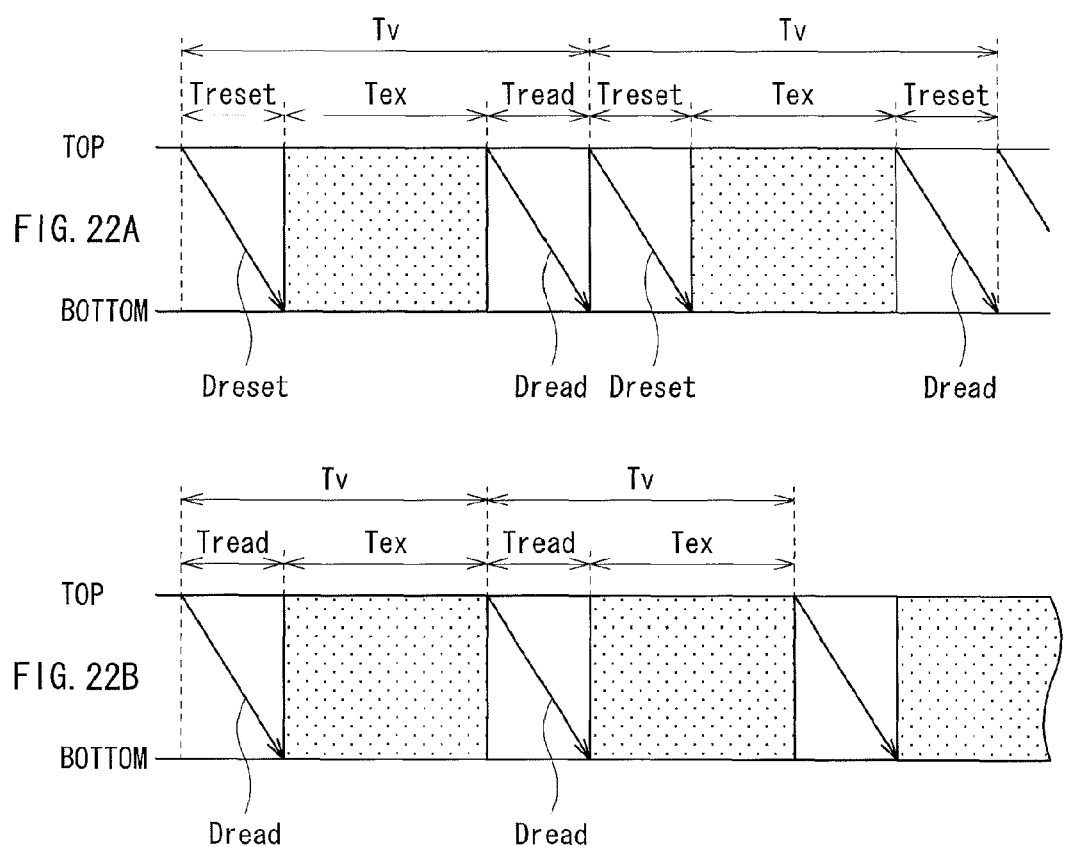
FIGS. 22A and 22B are schematic diagrams each illustrating an operation example of an image pickup unit according to Modification 1-4 of the first embodiment.

For example, as illustrated in FIG. 22A, the read scan period Tread may not overlap with the reset scan period Treset. Alternatively, for example, as illustrated in FIG. 22B, only the read scan period Tread may be provided without the reset scan period Treset such that read operation of the signal charge from the pixel 20 and the pixel reset operation for resetting the signal charge in the pixel 20 may be concurrently performed as illustrated in FIG. 11 in the read scan period Tread.

Figure 23A:
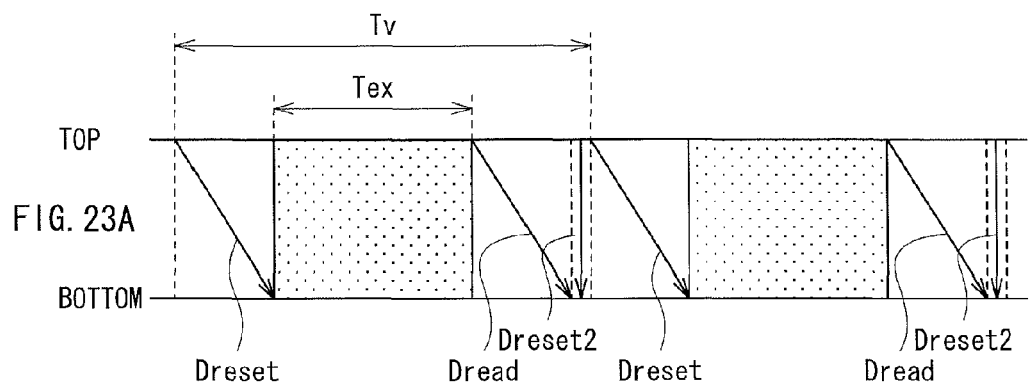
FIGS. 23A to 23C are schematic diagrams each illustrating an operation example of an image pickup unit according to Modification 1-4 of the first embodiment.
Figure 23B:
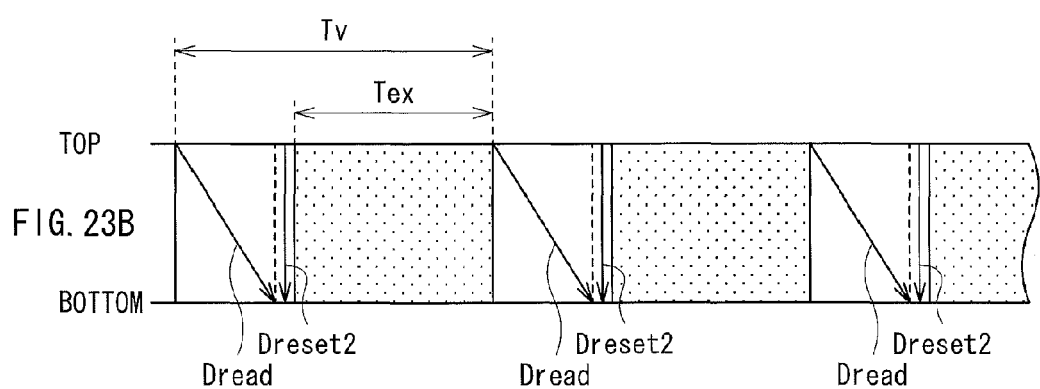
Figure 23C:
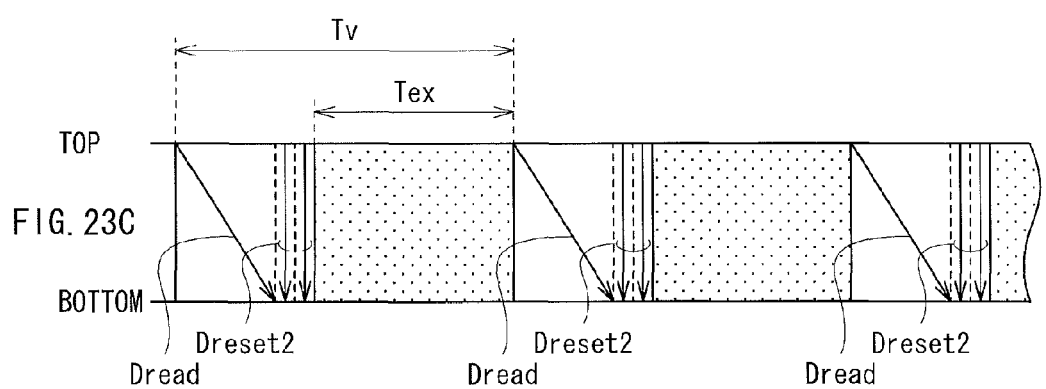

Alternatively, for example, as illustrated in FIGS. 23A to 23C, all the read control lines Lread may be collectively (concurrently) subjected to reset operation (reset drive Dreset2). Specifically, as illustrated in FIG. 23A, collective reset drive Dreset2 may be performed between scan for the read drive Dread and scan for the reset drive Dreset. Alternatively, as illustrated in FIG. 23B, the scan for the reset drive Dreset in FIG. 23A may be omitted. Alternatively, as illustrated in FIG. 23C, further collective reset drive Dreset2 may be performed after the collective reset drive Dreset2 illustrated in FIG. 23B.

2. Second Embodiment

An image pickup unit 2 according to a second embodiment is now described. In the second embodiment, the image pickup unit 2 includes a driver having a configuration different from that of the driver 36 according to the first embodiment. Specifically, although the driver 36 is configured using the transistor 43 to set the high-level voltage VH of the row scan signal Vread in the first embodiment, the driver is configured using a diode in the second embodiment. Other configurations are similar to those in the first embodiment (FIG. 1). It is to be noted that substantially the same components as those of the image pickup unit 1 according to the first embodiment, etc., are designated by the same numerals, and description of them is appropriately omitted.

Figure 24:
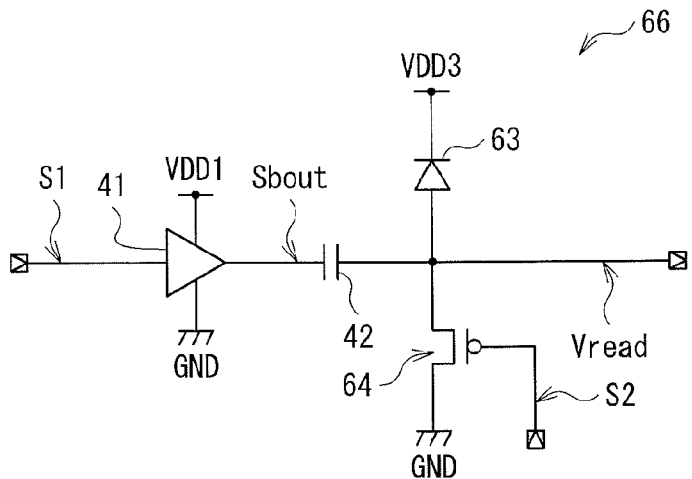
FIG. 24 is a circuit diagram illustrating an exemplary configuration of a driver according to a second embodiment.

FIG. 24 illustrates an exemplary configuration of a driver 66 relevant to the image pickup unit 2. The driver 66 includes a diode 63 and a transistor 64. The diode 63 is a diode with Von as ON voltage, and has an anode that is connected to the second terminal of the capacitor 42 and to the output terminal of the driver 66, and a cathode to which a voltage VDD3 is supplied. In this exemplary case, the transistor 64 is configured of a field effect transistor of a P channel type (P type), and has a gate to which a signal S2 is supplied, a source to which the ground voltage GND is supplied, and a drain that is connected to the second terminal of the capacitor 42 and to the output terminal of the driver 66. The voltage VDD1 may be, for example, 12 V, and the voltage VDD3 may be, for example, 8 V.

The diode 63 corresponds to a specific but not limitative example of "voltage setting section" of the disclosure. The transistor 64 corresponds to a specific but not limitative example of "reset switch" of the disclosure.

As described later, the driver 66 operates to suppress variations in signal level of the row scan signal Vread by regularly resetting a voltage of the row scan signal Vread with the signal S2. Description is now made on operation for reset of the voltage of the row scan signal Vread and on normal operation after the reset.

Figure 25:
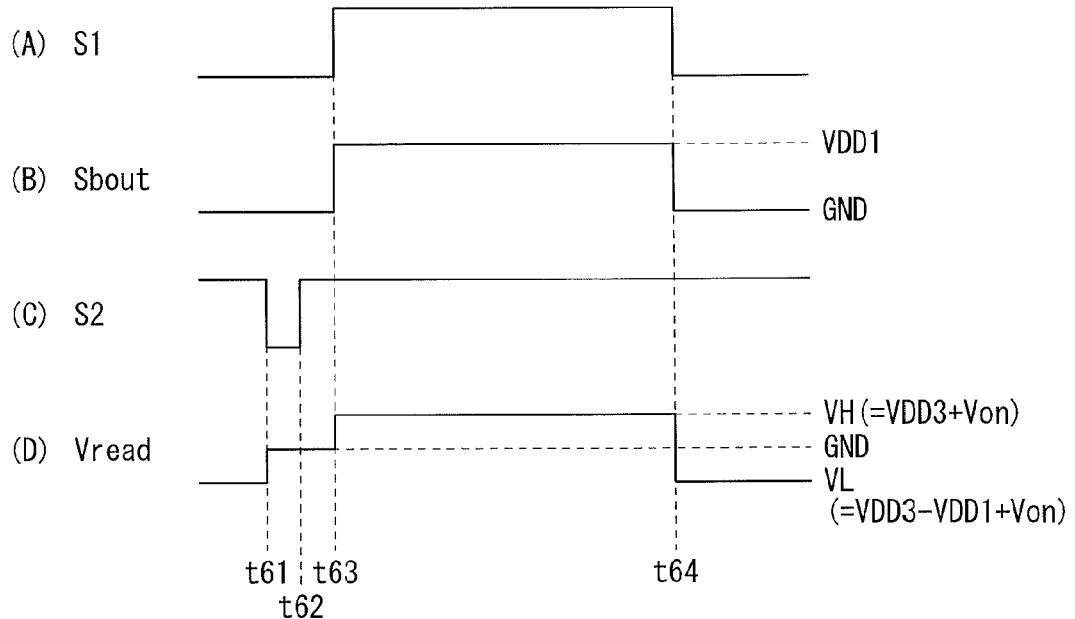
FIG. 25 is a timing waveform chart illustrating an operation example in one state of the driver illustrated in FIG. 24.

FIG. 25 illustrates exemplary timing waveforms of the driver 66 for reset of the voltage of the row scan signal Vread, where (A) illustrates a waveform of the signal S1, (B) illustrates a waveform of the signal Sbout, (C) illustrates a waveform of the signal S2, and (D) illustrates a waveform of the row scan signal Vread.

First, at timing t61, the signal S2 is changed from a high level to a low level ((C) of FIG. 25). As a result, the transistor 64 is changed from an OFF state into an ON state, and thus the row scan signal Vread is changed into the ground voltage GND ((D) of FIG. 25). Consequently, the row scan signal Vread is reset.

Subsequently, at timing t62, the signal S2 is changed from the low level to the high level ((C) of FIG. 25). As a result, the transistor 64 is changed from the ON state into the OFF state, and output of the driver 66 is thus floated, and therefore the row scan signal Vread is maintained at the ground voltage GND ((D) of FIG. 25).

Subsequently, at timing t63, the signal S1 is changed from a low level to a high level ((A) of FIG. 25). As a result, the output signal Sbout from the buffer circuit 41 is changed from a low level (the ground voltage GND) to a high level (the voltage VDD1) ((B) of FIG. 25). Accordingly, the row scan signal Vread starts to be changed to the voltage VDD1, but the diode 63 is turned on at the same time, so that the row scan signal Vread is clamped to the voltage VDD3+Von (high-level voltage VH) ((D) of FIG. 25).

Subsequently, at timing t64, the signal S1 is changed from the high level to the low level ((A) of FIG. 25). As a result, the output signal Sbout from the buffer circuit 41 is changed from the high level (voltage VDD1) to the low level (ground voltage GND) ((B) of FIG. 25). Accordingly, the row scan signal Vread is changed from the high-level voltage VH (voltage VDD3+Von) to a low-level voltage VL (voltage VDD3-voltage VDD1+Von) ((D) of FIG. 25).

In this way, the row scan signal Vread is reset to the ground voltage GND upon falling of the signal S2, and then rises upon rising of the signal S1, and falls upon falling of the signal S1.

Figure 26:
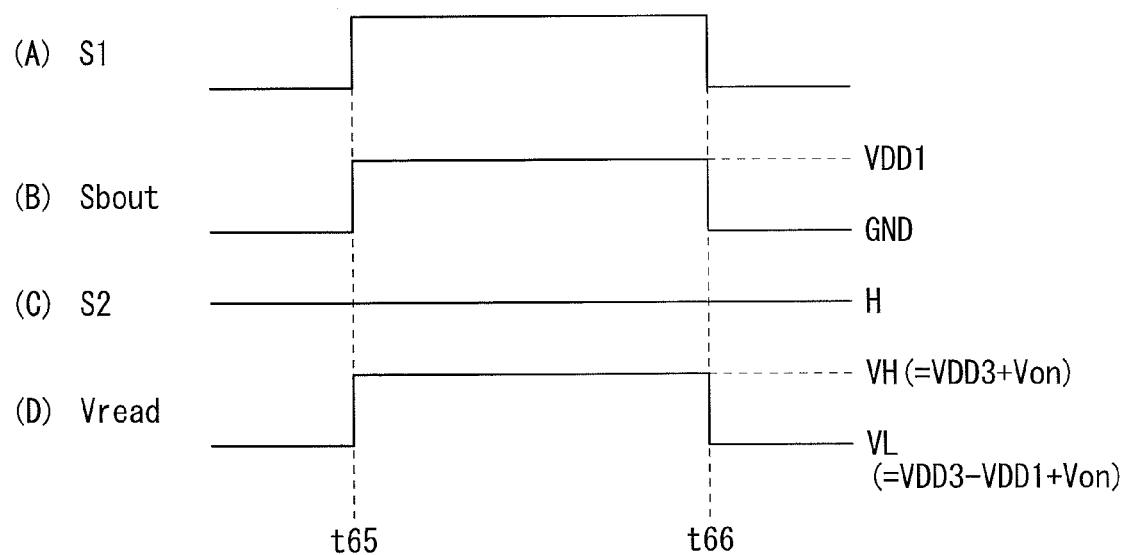
FIG. 26 is a timing waveform chart illustrating an operation example in the other state of the driver illustrated in FIG. 24.

FIG. 26 illustrates exemplary timing waveforms of the driver 66 for normal operation after the reset, where (A) illustrates a waveform of the signal S1, (B) illustrates a waveform of the signal Sbout, (C) illustrates a waveform of the signal S2, and (D) illustrates a waveform of the row scan signal Vread. In this exemplary case, the signal S2 is continuously maintained at a high level ((C) of FIG. 26), and therefore output of the driver 66 is continuously floated. Consequently, the row scan signal Vread makes a transition between the low-level voltage VL (voltage VDD3-voltage VDD1+Von) and the high-level voltage VH (voltage VDD3+Von).

Figure 27:
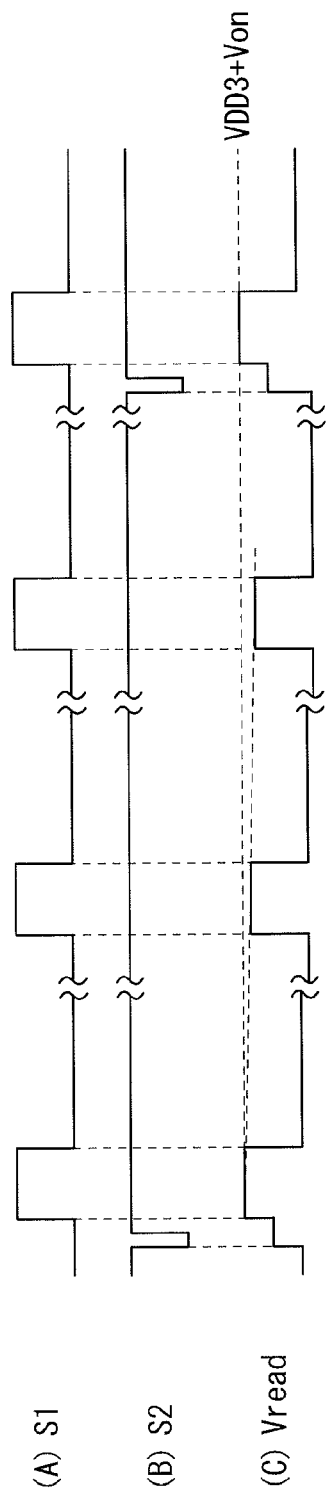
FIG. 27 is a timing waveform chart illustrating an operation example of the driver illustrated in FIG. 24.

FIG. 27 illustrates timing of reset operation of the row scan signal Vread, where (A) illustrates a waveform of the signal S1, (B) illustrates a waveform of the signal S2, and (C) illustrates a waveform of the row scan signal Vread.

Since the row scan signal Vread is reset by application of a pulse as the signal S2, the high-level voltage VH of the row scan signal Vread becomes VDD3+Von after the reset. However, for example, in the case where a leakage current occurs in each of elements configuring the driver 66, the voltage of the row scan signal Vread may gradually decrease with the lapse of time as illustrated in FIG. 27. In such a case, the voltage of the row scan signal Vread is reset by regularly applying a pulse as the signal S2 so that a voltage level of the row scan signal Vread is not greatly varied.

As described above, even if the diode is used to set the high-level voltage of the row scan signal, effects similar to those in the first embodiment are achieved.

Moreover, in the second embodiment, the transistor 64 is provided to regularly reset the voltage of the row scan signal. As a result, even if the voltage level of the row scan signal is varied due to a leakage current etc., such a variation is suppressed.

Modification 2-1

Although the transistor 64 is used to suppress a variation in voltage of the row scan signal Vread in the second embodiment, the operation mode is not limited thereto. Modification 2-1 is described in detail below.

Figure 28:
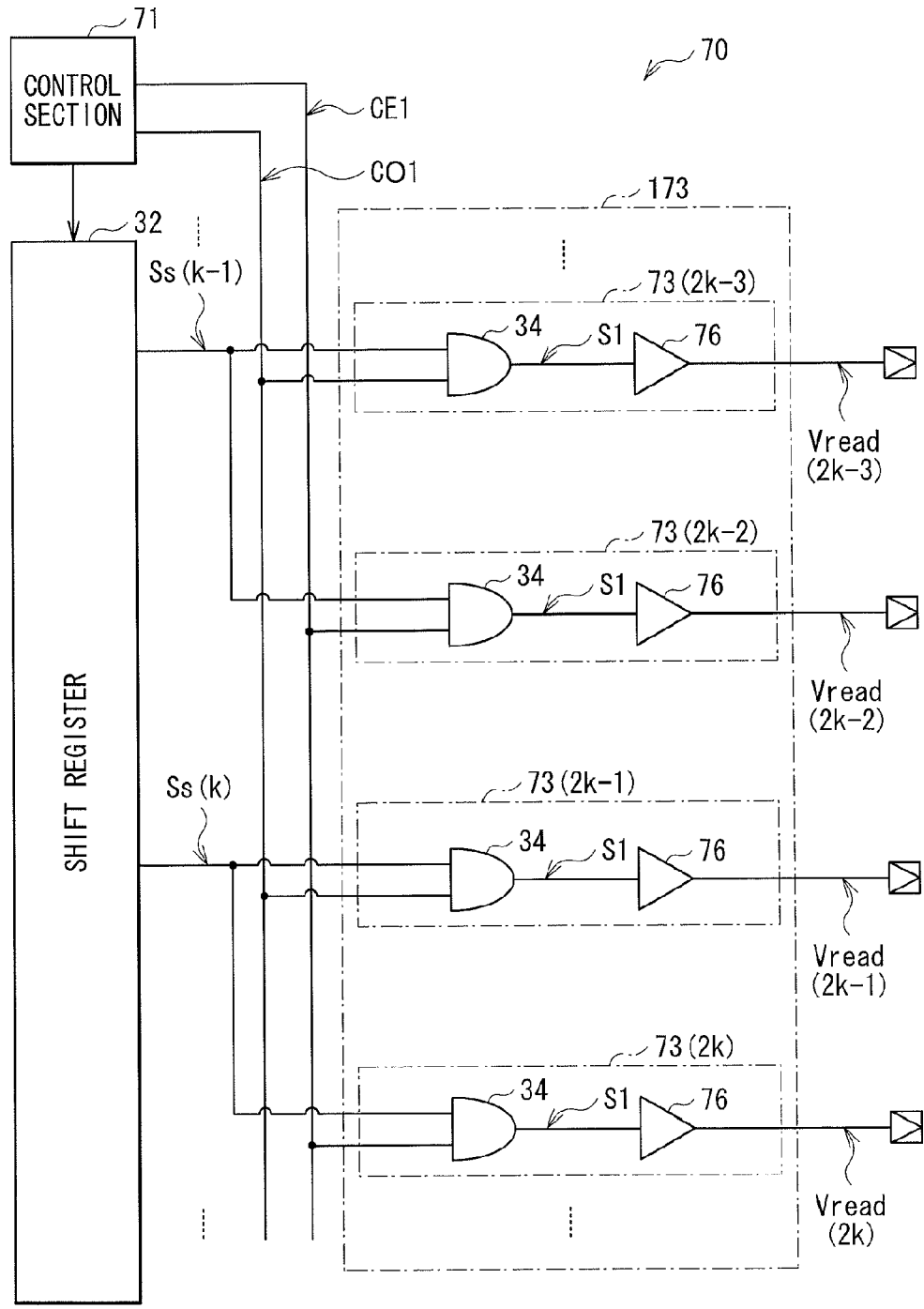
FIG. 28 is a block diagram illustrating an exemplary configuration of a row scan section according to Modification 2-1 of the second embodiment.

FIG. 28 illustrates an exemplary configuration of a row scan section 70 according to the Modification 2-1. The row scan section 70 includes a drive section 173 having a plurality of drive circuits 73 and a control section 71. Each drive circuit 73 includes an AND circuit 34 and a driver 76. Specifically, the drive circuit 73 does not include the NAND circuit 35 for generating the signal S2 provided in the first and second embodiments etc. (FIG. 4), and the driver 76 generates the row scan signal Vread using the signal S1 instead of the signal S2. The control section 71 generates control signals CO1 and CE1 to control the drive section 173.

Figure 29:
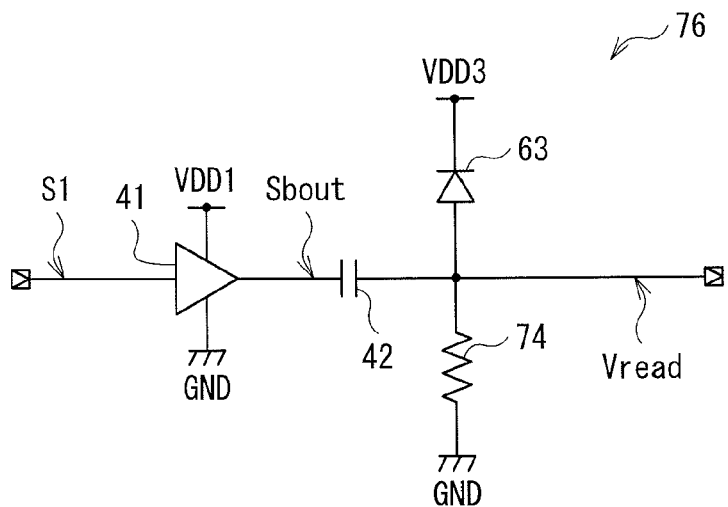
FIG. 29 is a circuit diagram illustrating an exemplary configuration of a driver according to the Modification 2-1 of the second embodiment.

FIG. 29 illustrates an exemplary configuration of the driver 76. The driver 76 has a resistor 74 for suppressing variations in voltage level of the row scan signal Vread. Specifically, although the driver 66 (FIG. 24) according to the second embodiment is configured to suppress variations in voltage level of the row scan signal Vread by regularly turning on the transistor 64, such variations are suppressed with the resistor 74 in the Modification 2-1. The voltage VDD1 may be, for example, 12 V, and the voltage VDD3 may be, for example, 8 V.

Figure 30:
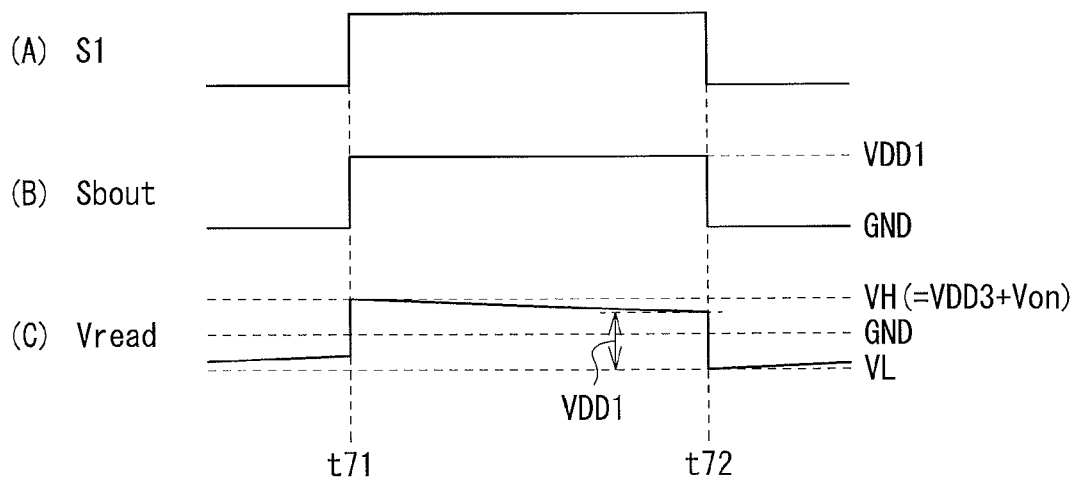
FIG. 30 is a timing waveform chart illustrating an operation example of the driver illustrated in FIG. 29.

FIG. 30 illustrates exemplary timing waveforms of the driver 76, where (A) illustrates a waveform of the signal S1, (B) illustrates a waveform of the signal Sbout, and (C) illustrates a waveform of the row scan signal Vread.

First, at timing t71, the signal S1 is changed from a low level to a high level ((A) of FIG. 30). As a result, the output signal Sbout from the buffer circuit 41 is changed from a low level (the ground voltage GND) to a high level (the voltage VDD1) ((B) of FIG. 30). Accordingly, the row scan signal Vread rises, and is clamped at the voltage VDD3+Von (high-level voltage VH) at which the diode 63 is turned on ((C) of FIG. 30).

Then, in a period from timing t71 to timing t72, a current flows toward the ground (GND) through the resistor 74, thereby the row scan signal Vread is gradually varied toward the ground voltage GND.

Subsequently, at timing t72, the signal S1 is changed from the high level to the low level ((A) of FIG. 30). As a result, the output signal Sbout from the buffer circuit 41 is changed from the high level (voltage VDD1) to the low level (ground voltage GND) ((B) of FIG. 30). Accordingly, the row scan signal Vread is changed by the voltage VDD1.

In this way, the row scan signal Vread rises upon rising of the signal S1, and falls upon falling of the signal S1.

Modification 2-2

Any of the Modifications 1-1 to 1-4 of the first embodiment may be applied to the image pickup unit 2 according to the second embodiment and to the image pickup unit according to the Modification 2-1.

3. Application Example

Description is now made on an application example, to the image pickup display system, of each of the image pickup units described in the above-described embodiments and Modifications thereof.

Figure 31:
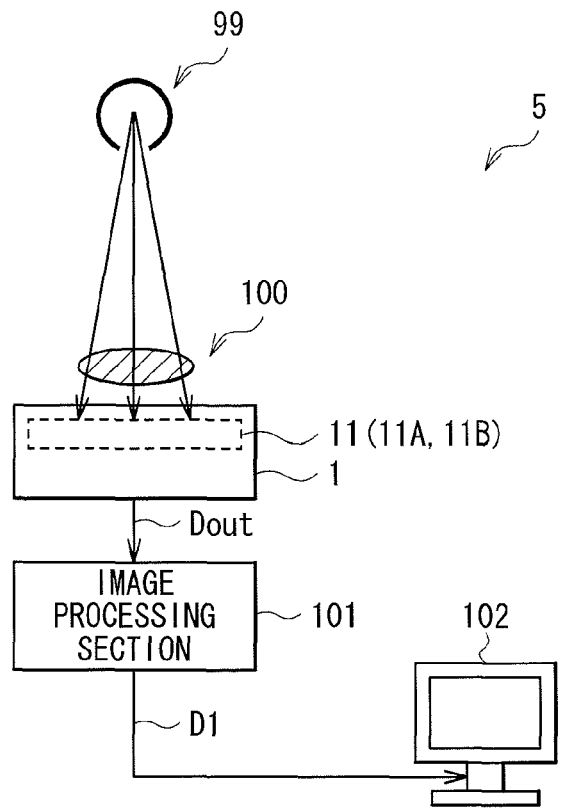
FIG. 31 is a block diagram illustrating an exemplary configuration of an image pickup display system to which the image pickup unit according to any of the embodiments and the Modifications is applied.

FIG. 31 schematically illustrates an example of a rough configuration of an image pickup display system 5 according to an application example. The image pickup display system 5 is configured as an image pickup display system using radiation (a radiographic image pickup display system). Examples of possible applications of such a system include medical equipment (an X-ray image pickup unit such as digital radiography), a portable-object inspection X-ray image pickup unit in use at airports and other places, and an industrial X-ray image pickup unit (such as a unit for inspection of dangerous objects in bulk containers and a unit for inspection of objects in bags).

The image pickup display system 5 includes the image pickup unit 1 (radiographic image pickup display unit) having an image pickup section 11A or 11B that captures an image using received radiation rays, an image processing section 101, and a display unit 102.

Figure 32A:
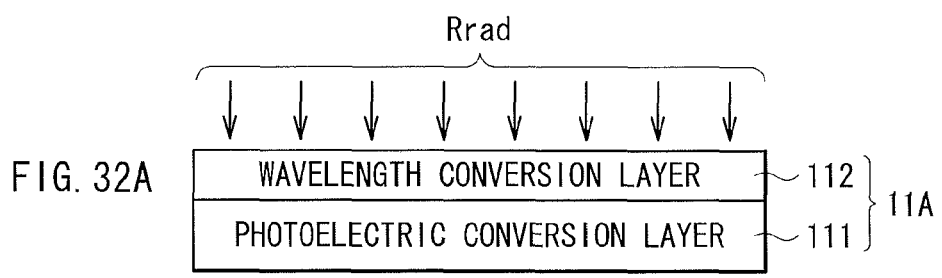
FIGS. 32A and 32B are explanatory diagrams each illustrating an exemplary configuration of an image pickup section illustrated in FIG. 31.
Figure 32B:
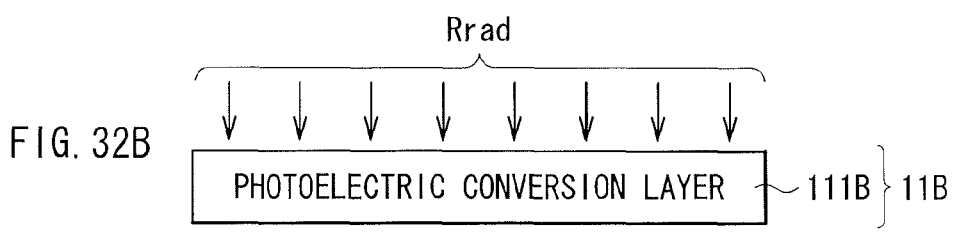

FIGS. 32A and 32B each illustrate an exemplary configuration of the image pickup section using radiation rays, where FIG. 32A illustrates an exemplary configuration of the image pickup section 11A, and FIG. 32B illustrates an exemplary configuration of the image pickup section 11B.

The image pickup section 11A further includes a wavelength conversion layer 112 in addition to the photoelectric conversion layer 111 described in any of the above-described embodiments and the Modifications. Specifically, the wavelength conversion layer 112 is provided on the photoelectric conversion layer 111 (on a light receiving surface (imaging surface) of the image pickup section 11A). The wavelength conversion layer 112 converts a wavelength of each of radiation rays Rrad (such as α rays, (β rays, γ rays, and X rays) into a wavelength in the sensitivity range of the photoelectric conversion layer 111, so that the photoelectric conversion layer 111 is allowed to read information based on the radiation rays Rrad. The wavelength conversion layer 112 may be formed of, for example, a phosphor (for example, a scintillator) that converts radiation rays such as X-rays into visible light. For example, such a wavelength conversion layer 112 may be produced by forming an organic planarization film or a planarization film including a spin-on-glass material etc. on the photoelectric conversion layer 111, and then forming a phosphor film including CsI, NaI, or $CaF_2$ etc. thereon.

The image pickup section 11B includes the photoelectric conversion layer 111B in place of the photoelectric conversion layer 111 described in any of the above-described embodiments and Modifications thereof. The photoelectric conversion layer 111B directly generates electric signals in response to received radiation rays Rrad. Specifically, while the image pickup section 11A illustrated in FIG. 32A is applied to a so-called indirect radiographic image pickup unit, the image pickup section 11B is applied to a so-called direct radiographic image pickup unit. It is to be noted that the photoelectric conversion layer 111B applied to such a direct radiographic image pickup unit may be configured of, for example, amorphous selenium (a-Se) semiconductor, cadmium tellurium (CdTe) semiconductor, or the like The image processing section 101 performs predetermined image processing on output data Dout (imaging signals) output from the image pickup unit 1 to produce image data D1. The display unit 102 performs image display based on the image data D1 produced by the image processing section 101 on a predetermined monitor screen.

In the image pickup display system 5 having such a configuration, the image pickup unit 1 (a radiographic image pickup unit) captures image data Dout of a subject 100 based on irradiation light (radiation rays in this example) applied from a light source (a radiation source such as an X-ray source) 99 to the subject 100, and outputs the image data Dout to the image processing section 101. The image processing section 101 performs the predetermined image processing on the received image data Dout, and outputs the image data (display data) D1 subjected to the image processing to the display unit 102. The display unit 102 displays image information (a captured image) on the monitor screen based on the received image data D1.

In this way, in the image pickup display system 5 of this application example, the image pickup unit 1 may acquire an image of the subject 100 in a form of electric signals, thereby allowing image display through transmission of the acquired electric signals to the display unit 102. In other words, the image pickup display system 5 allows observation of an image of the subject 100 without any radiographic film unlike in the past, and is ready for moving-image photography and moving-image display.

It is to be noted that although the application example has been described with an exemplary case where the image pickup unit 1 is configured as a radiographic image pickup unit to provide an image pickup display system using radiation rays, the image pickup display system according to one embodiment of the disclosure may be applied to an image pickup display system including any other type of image pickup unit.

Although the technology of the present disclosure has been described with some embodiments, some Modifications, and the application example hereinbefore, the technology is not limited thereto, and various modifications or alterations thereof may be made.

For example, although the low-level power voltage of the buffer circuit 41 is set to the ground voltage GND in any of the above-described embodiments, Modifications, and application example, the circuit configuration is not limited thereto. Alternatively, as illustrated in FIGS. 33A to 33C, the driver may be modified such that the high-level power voltage of the buffer circuit 41 is set to the ground voltage GND.

Figure 33A:
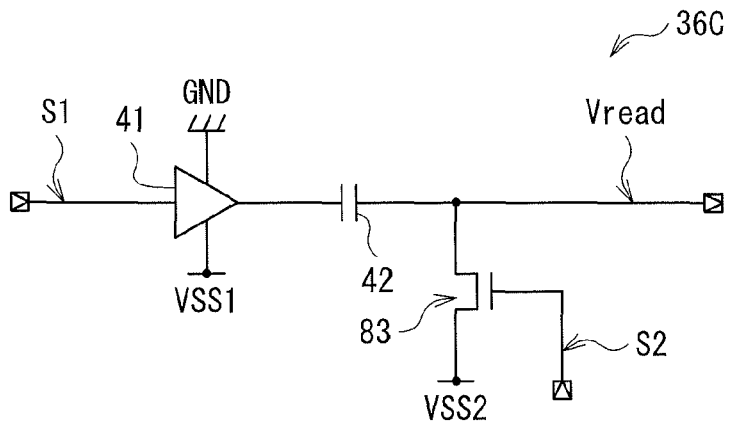
FIGS. 33A to 33C are circuit diagrams each illustrating an exemplary configuration of a driver according to Modification of the image pickup display system.

FIG. 33A illustrates an exemplary configuration of a driver 36C according to such a Modification, where the driver 36 (FIG. 5) according to the first embodiment is modified in the above way. The driver 36C has a transistor 83 for setting of the low-level voltage VL of the row scan signal Vread.

Figure 33B:
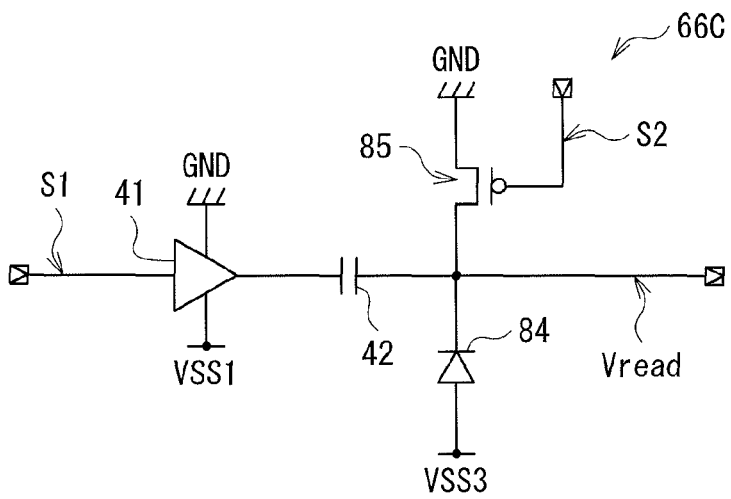

FIG. 33B illustrates an exemplary configuration of a driver 66C according to this Modification, where the driver 66 (FIG. 24) according to the above-described second embodiment is modified in the above way. The driver 66C has a diode 84 for setting of the low-level voltage VL of the row scan signal Vread, and has a transistor 85 for suppression of variations in voltage of the row scan signal Vread.

Figure 33C:
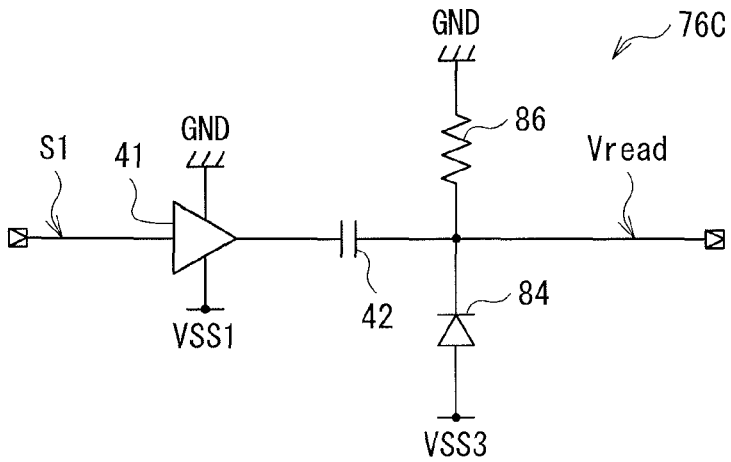

FIG. 33C illustrates an exemplary configuration of a driver 76C according to this Modification, where the driver 76 (FIG.

29) according to the Modification 2-1 of the second embodiment is modified in the above way. The driver 76C has a diode 84 for setting of the low-level voltage VL of the row scan signal Vread, and has a resistance 86 for suppression of variations in voltage of the row scan signal Vread.

Figure 34:
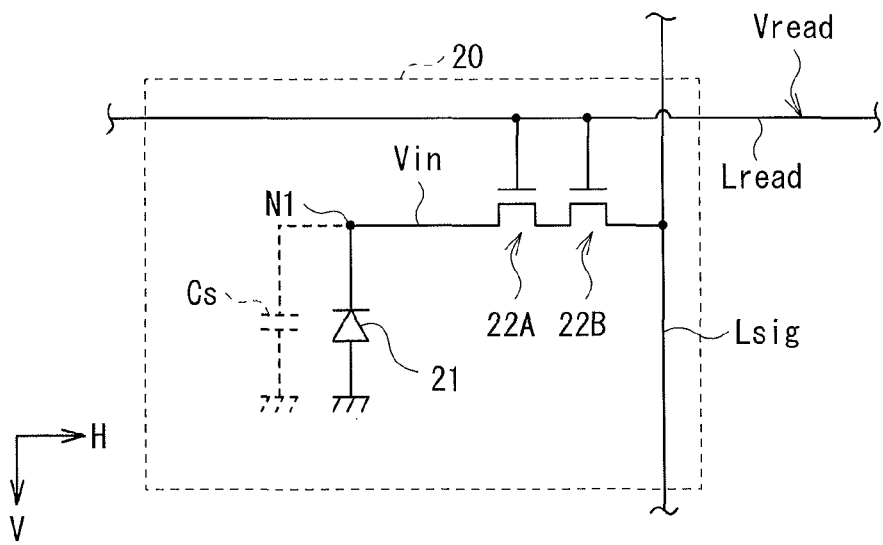
FIG. 34 is a circuit diagram illustrating an exemplary configuration of a pixel according to the Modification.

In addition, for example, although the pixel 20 has one transistor 22 in any of the above-described embodiments, Modifications, and application example, the pixel configuration is not limited thereto. Alternatively, for example, as illustrated in FIG. 34, the pixel 20 may have transistors 22A and 22B that are disposed in series so as to serve as one transistor 22.

Figure 35A:
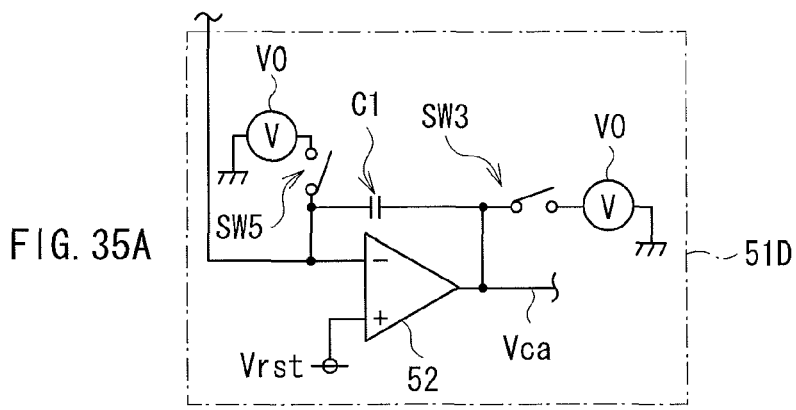
FIGS. 35A and 35B are circuit diagrams each illustrating an exemplary configuration of a charge amplifier according to the Modification.
Figure 35B:
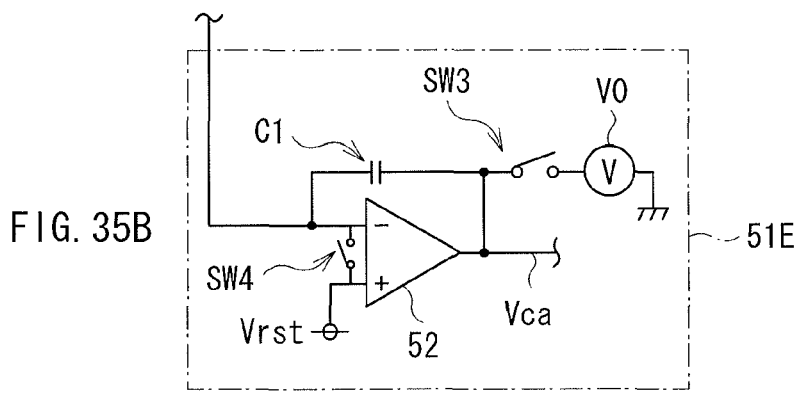

Moreover, for example, although the charge amplifier 51 has the switch SW1 that makes electrical continuity between two terminals of the capacitor C1 in any of the above-described embodiments, Modifications, and application example, the circuit configuration is not limited thereto. Alternatively, for example, as illustrated in FIG. 35A, a switch SW3 may be provided on an output side of the operational amplifier 52, and a switch SW5 may be provided on a negative input terminal side thereof such that the capacitor C1 is reset by turning on the switches SW3 and SW5. Alternatively, for example, as illustrated in FIG. 35B, a switch SW3 may be provided on an output side of the operational amplifier 52, and a switch SW4 may be provided between a positive input terminal and a negative input terminal of the operational amplifier 52 such that the capacitor C1 is reset by turning on the switches SW3 and SW4. For example, the switch SW5 may be provided in one chip or on one substrate together with the operational amplifier 52 etc., or may be provided in another chip, on another substrate, or in a panel of the image pickup section 11.

Furthermore, for example, although the column selection section 17 has the S/H circuits 53 in any of the above-described embodiments, Modifications, and application example, the circuit configuration is not limited thereto. Alternatively, for example, the column selection section may have correlated double sampling (CDS) circuits in place of the S/H circuits 53.

Figure 36:
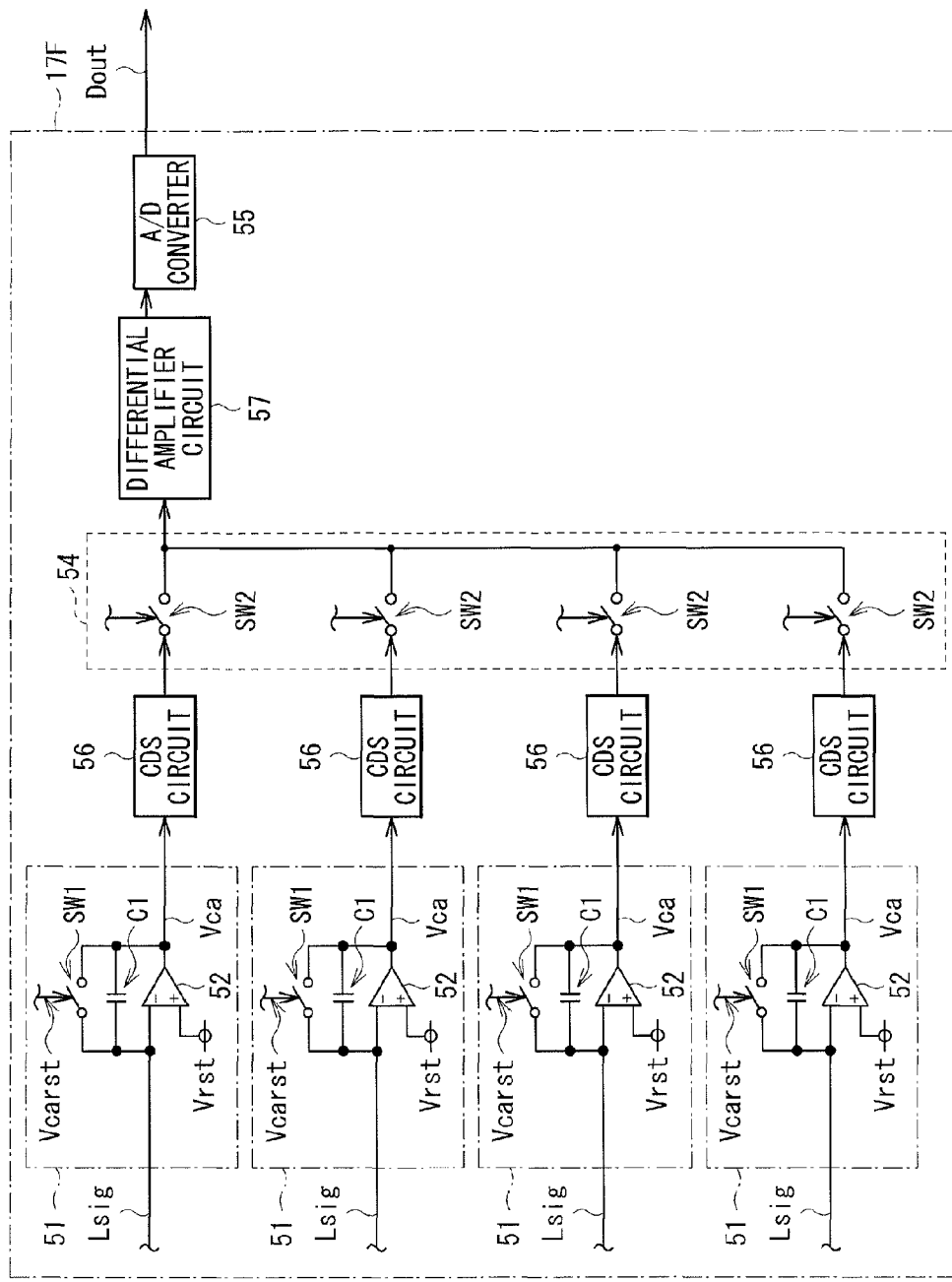
FIG. 36 is a circuit diagram illustrating an exemplary configuration of a column selection section according to the Modification.

FIG. 36 illustrates an exemplary configuration of a column selection section 17F according to such a Modification. The column selection section 17F includes CDS circuits 56 and a differential amplifier circuit 57. Specifically, the column selection section 17 according to the above-described first embodiment, etc., is modified in such a manner that the CDS circuits 56 are provided in place of the S/H circuits 53, and the differential amplifier circuit 57 is provided between the multiplexer 54 and the A/D converter 55.

The CDS circuit 56 is a circuit that captures an imaging signal from the charge amplifier 51 at a correlative timing to perform sampling. Specifically, for example, as illustrated in FIG. 37, the CDS circuit 56 has two switches SW5 and two capacitors C2 arranged in parallel to each other.

Figure 37:
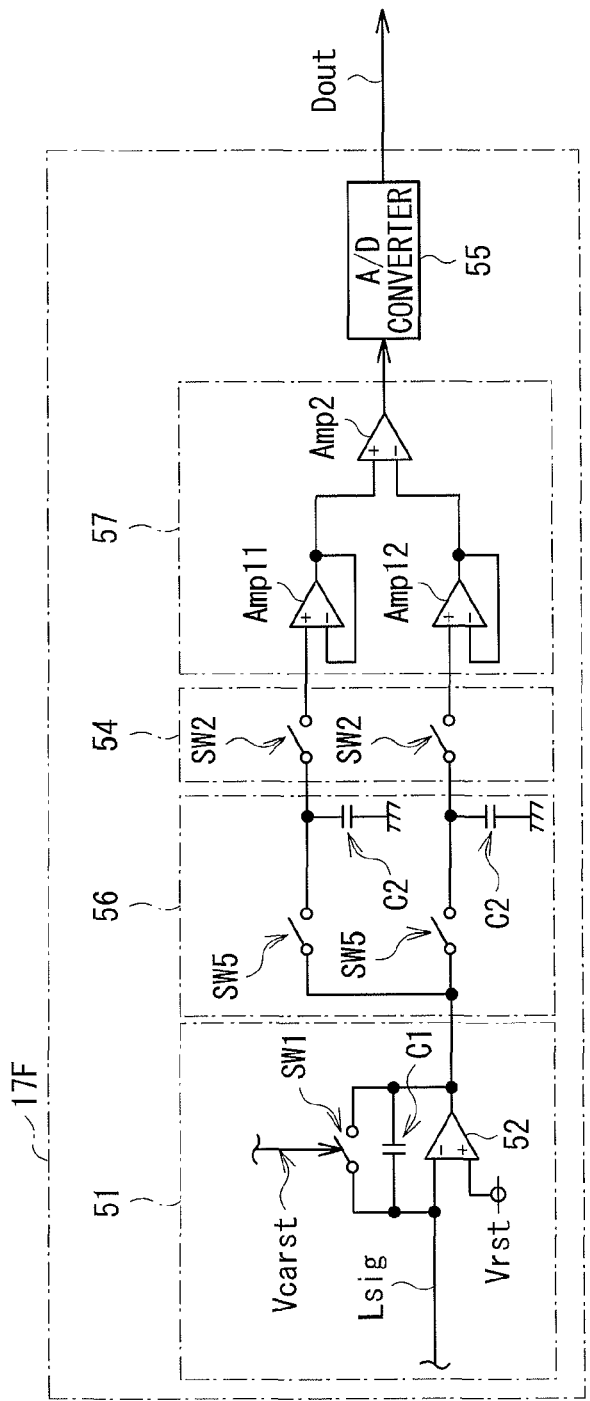
FIG. 37 is a circuit diagram illustrating an exemplary configuration of each of a CDS circuit and a differential amplifier circuit illustrated in FIG. 36.

The differential amplifier circuit 57, which has three amplifiers Amp11, Amp12, and Amp2, for example, as illustrated in FIG. 37, is a circuit that performs predetermined differential amplification operation. Specifically, the differential amplifier circuit 57 performs differential amplification operation between a signal that is sent through a first switch SW5 and a first capacitor C2 in the CDS circuit 56 and a first switch SW2 in the multiplexer 54, and a signal that is sent through a second switch SW5 and a second capacitor C2 in the CDS circuit 56 and a second switch SW2 in the multiplexer 54.

In this way, in the case where a column selection section, which is configured with other circuits such as the CDS circuits 56 and the differential amplifier circuit 57, is provided, similar effects are also obtained through the technique of any of the above-described embodiments etc.

It is to be noted that the technology may be configured as follows.

(1) An image pickup unit, including:
a signal generating section generating a pulse signal that makes transitions between a first voltage and a low-noise second voltage;
a voltage holding section holding a difference between a voltage of the pulse signal and a voltage of an output node;
a voltage setting section that generates a pixel selection signal through setting the voltage of the output node to a third voltage in correspondence to a transition of the pulse signal from the second voltage to the first voltage, and outputs the pixel selection signal from the output node; and
an image pickup section driven by the pixel selection signal.

(2) The image pickup unit according to (1), wherein the voltage setting section includes a switch that is turned on to set the pixel selection signal to the third voltage.

(3) The image pickup unit according to (2), wherein the switch is turned on in a first period containing timing at which the pulse signal makes the transition from the second voltage to the first voltage.

(4) The image pickup unit according to (1), wherein the voltage setting section includes a diode that is turned on to set the pixel selection signal to the third voltage.

(5) The image pickup unit according to (4), wherein the voltage setting section further includes a reset switch that is turned on to reset a voltage of the pixel selection signal.

(6) The image pickup unit according to (5), wherein the reset switch is turned on in a second period in a period during which the pulse signal has the second voltage.

(7) The image pickup unit according to (6), wherein the second period is provided prior to the transition of the pulse signal from the second voltage to the first voltage.

(8) The image pickup unit according to (6) or (7), wherein the pulse signal includes a plurality of pulses, and
the second period is provided corresponding to a certain number of the pulses.

(9) The image pickup unit according to (4), wherein the voltage setting section further includes a resistor that has a first terminal connected to the output node, and a second terminal to which the second voltage is supplied.

(10) The image pickup unit according to any one of (4) to (9), wherein the diode has an anode that is connected to the output node, and a cathode to which a voltage corresponding to the third voltage is supplied.

(11) The image pickup unit according to any one of (1) to (10), wherein the second voltage is a ground voltage.

(12) The image pickup unit according to any one of (1) to (11), wherein the voltage holding section includes a capacitor.

(13) A method of driving an image pickup unit, including:
holding a difference between a voltage of an output node and a voltage of a pulse signal that makes transitions between a first voltage and a low-noise second voltage;
generating a pixel selection signal through setting the voltage of the output node to a third voltage in correspondence to a transition of the pulse signal from the second voltage to the first voltage, and outputting the pixel selection signal from the output node; and
driving an image pickup section by the pixel selection signal.

(14) An image pickup display system provided with an image pickup unit, and a display unit that displays an image captured by the image pickup unit, the image pickup unit including:
- a signal generating section generating a pulse signal that makes transitions between a first voltage and a low-noise second voltage;
- a voltage holding section holding a difference between a voltage of the pulse signal and a voltage of an output node;
- a voltage setting section that generates a pixel selection signal through setting the voltage of the output node to a third voltage in correspondence to a transition of the pulse signal from the second voltage to the first voltage, and outputs the pixel selection signal from the output node; and
- an image pickup section driven by the pixel selection signal.

The present disclosure contains subject matter related to that disclosed in Japanese Priority Patent Application JP 2012-162455 filed in the Japan Patent Office on Jul. 23, 2012, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. An image pickup unit, comprising:
   a driver circuit configured to drive an image pickup section, the driver circuit comprising:
      a signal generating section that generates a pulse signal that makes transitions between a first voltage and a second voltage which is low in noise compared with the first voltage;
      a voltage holding section that holds a difference between a voltage of the pulse signal and a voltage of an output node of the driver circuit; and
      a voltage setting section that generates a pixel selection signal through setting the voltage of the output node to a third voltage in correspondence to a transition of the pulse signal from the second voltage to the first voltage, and outputs the pixel selection signal from the output node; and
   the image pickup section that is driven by the pixel selection signal.

2. The image pickup unit according to claim 1, wherein the voltage setting section includes a switch that is turned on to set the pixel selection signal to the third voltage.

3. The image pickup unit according to claim 2, wherein the switch is turned on in a first period containing timing at which the pulse signal makes the transition from the second voltage to the first voltage.

4. The image pickup unit according to claim 1, wherein the voltage setting section includes a diode that is turned on to set the pixel selection signal to the third voltage.

5. The image pickup unit according to claim 4, wherein the voltage setting section further includes a reset switch that is turned on to reset a voltage of the pixel selection signal.

6. The image pickup unit according to claim 5, wherein the reset switch is turned on in a second period in a period during which the pulse signal has the second voltage.

7. The image pickup unit according to claim 6, wherein the second period is provided prior to the transition of the pulse signal from the second voltage to the first voltage.

8. The image pickup unit according to claim 6, wherein
   the pulse signal includes a plurality of pulses, and
   the second period is provided corresponding to a certain number of the plurality of pulses.

9. The image pickup unit according to claim 4, wherein the voltage setting section further includes a resistor that has a first terminal connected to the output node, and a second terminal to which the second voltage is supplied.

10. The image pickup unit according to claim 4, wherein the diode has an anode that is connected to the output node, and a cathode to which a voltage corresponding to the third voltage is supplied.

11. The image pickup unit according to claim 1, wherein the second voltage is a ground voltage.

12. The image pickup unit according to claim 1, wherein the voltage holding section includes a capacitor.

13. A method of driving an image pickup unit, comprising:
   holding a difference between a voltage of an output node of a driver circuit coupled to an image pickup section and a voltage of a pulse signal that makes transitions between a first voltage and a second voltage which is low in noise compared with the first voltage;
   generating a pixel selection signal through setting the voltage of the output node to a third voltage in correspondence to a transition of the pulse signal from the second voltage to the first voltage, and outputting the pixel selection signal from the output node; and
   driving the image pickup section by the pixel selection signal.

14. An image pickup display system provided with an image pickup unit, and a display unit that displays an image captured by the image pickup unit, the image pickup unit comprising:
   a driver circuit configured to drive an image pickup section, the driver circuit comprising:
      a signal generating section that generates a pulse signal that makes transitions between a first voltage and a second voltage which is low in noise compared with the first voltage;
      a voltage holding section that holds a difference between a voltage of the pulse signal and a voltage of an output node of the driver circuit; and
      a voltage setting section that generates a pixel selection signal through setting the voltage of the output node to a third voltage in correspondence to a transition of the pulse signal from the second voltage to the first voltage, and outputs the pixel selection signal from the output node; and
   the image pickup section that is driven by the pixel selection signal.

* * * * *